United States Patent
Olson et al.

(10) Patent No.: US 11,561,795 B2
(45) Date of Patent: Jan. 24, 2023

(54) ACCUMULATING DATA VALUES AND STORING IN FIRST AND SECOND STORAGE DEVICES

(71) Applicant: Arm Limited, Cambridge (GB)

(72) Inventors: Jens Olson, San Jose, CA (US); John Wakefield Brothers, III, Calistoga, CA (US); Jared Corey Smolens, Santa Clara, CA (US); Chi-wen Cheng, San Jose, CA (US); Daren Croxford, Swaffham Prior (GB); Sharjeel Saeed, Cambridge (GB); Dominic Hugo Symes, Cambridge (GB)

(73) Assignee: Arm Limited, Cambridge (GB)

( * ) Notice: Subject to any disclaimer, the term of this patent is extended or adjusted under 35 U.S.C. 154(b) by 50 days.

(21) Appl. No.: 16/834,833

(22) Filed: Mar. 30, 2020

(65) Prior Publication Data

US 2021/0303307 A1 Sep. 30, 2021

(51) Int. Cl.
*G06F 9/30* (2018.01)
*G06F 9/38* (2018.01)
*G06F 9/345* (2018.01)
*G06F 7/499* (2006.01)
*G06F 7/57* (2006.01)

(52) U.S. Cl.
CPC .......... *G06F 9/345* (2013.01); *G06F 7/49915* (2013.01); *G06F 7/57* (2013.01); *G06F 9/30043* (2013.01); *G06F 9/30098* (2013.01); *G06F 9/3893* (2013.01)

(58) Field of Classification Search
CPC ........................... G06F 9/30098; G06F 9/3893
See application file for complete search history.

(56) References Cited

U.S. PATENT DOCUMENTS

| | | | |
|---|---|---|---|
| 6,434,584 B1* | 8/2002 | Henderson | G06F 9/30181 708/490 |
| 2017/0139677 A1* | 5/2017 | Lutz | G06F 7/5336 |
| 2018/0276534 A1* | 9/2018 | Henry | G06F 9/3887 |
| 2018/0322390 A1* | 11/2018 | Das | G06F 9/30036 |
| 2021/0096818 A1* | 4/2021 | Huang | G06F 7/523 |

* cited by examiner

*Primary Examiner* — Jacob Petranek
(74) *Attorney, Agent, or Firm* — EIP US LLP

(57) ABSTRACT

Herein described is a method of operating an accumulation process in a data processing apparatus. The accumulation process comprises a plurality of accumulations which output a respective plurality of accumulated values, each based on a stored value and a computed value generated by a data processing operation. The method comprises storing a first accumulated value, the first accumulated value being one of said plurality of accumulated values, into a first storage device comprising a plurality of single-bit storage elements; determining that a predetermined trigger has been satisfied with respect to the accumulation process; and in response to the determining, storing at least a portion of a second accumulated value, the second accumulated value being one of said plurality of accumulated values, into a second storage device.

15 Claims, 15 Drawing Sheets

ACCUMULATING DATA VALUES AND STORING IN FIRST AND SECOND STORAGE DEVICES

BACKGROUND OF THE INVENTION

Field of the Invention

The present invention relates to operation of an accumulation process in a data processing apparatus and system.

Description of the Related Technology

As computing technologies advance and the use of neural networks in performing computing tasks becomes more extensive, the importance of managing the resources relied upon to run such neural networks (for example, processing, memory and hardware resources) is ever increasing. In the context of neural networks, particularly those having several layers of nodes, many accumulations are performed in order to implement the network and generate outputs from input data. A data accumulation system may be used to perform large volumes of successive accumulation operations and subsequently store the results of those accumulation operations. In such a scenario, it is understood that the efficiency, performance, and power consumption of a particular neural network is based, at least in part, upon the efficiency, performance, management, and power consumption of a data accumulation system used to carry out, and manage storage of, some, if not all, of the required accumulation operations and respective results thereof of that particular network.

It would be advantageous to reduce the power consumption and resources incurred by such a data accumulation system in performing accumulation operations and storing the results thereof, and to increase the efficiency of said system.

SUMMARY

According to a first aspect, there is provided a method of operating an accumulation process in a data processing apparatus, the accumulation process comprising a plurality of accumulations which output a respective plurality of accumulated values, each based on a stored value and a computed value generated by a data processing operation, the method comprising: storing a first accumulated value, the first accumulated value being one of said plurality of accumulated values, into a first storage device comprising a plurality of single-bit storage elements; determining that a predetermined trigger has been satisfied with respect to the accumulation process; and in response to the determining, storing at least a portion of a second accumulated value, the second accumulated value being one of said plurality of accumulated values, into a second storage device.

Advantageously, the aforementioned method and particularly the use of a predetermined trigger, provide a way to operate an accumulation process by determining when to switch from performing accumulations with respect to the first storage device to performing accumulations with respect to the second storage device. In this way, it is possible to control the number and frequency of reads and updates to the second storage device. Consequently, the method reduces the power consumption and increases the performance of an associated neural network.

According to a second aspect, there is provided a data processing apparatus comprising: an arithmetic logic unit (ALU) configured to perform a data processing operation; a first storage device comprising a plurality of single-bit storage elements arranged to receive a value output by the data processing operation; a second storage device; and control logic configured to perform a method of operating an accumulation process in a data processing apparatus, the accumulation process comprising a plurality of accumulations which output a respective plurality of accumulated values, each based on a stored value and a computed value generated by a data processing operation, the method comprising: storing a first accumulated value, the first accumulated value being one of said plurality of accumulated values, into a first storage device comprising a plurality of single-bit storage elements; determining that a predetermined trigger has been satisfied with respect to the accumulation process; and in response to the determining, storing at least a portion of a second accumulated value, the second accumulated value being one of said plurality of accumulated values, into a second storage device.

Advantageously, the aforementioned data processing apparatus provides a way to operate an accumulation process by determining when to switch from performing accumulations with respect to the first storage device to performing accumulations with respect to the second storage device. In this way, it is possible to control the number and frequency of reads and updates to the second storage device. Consequently, the data processing apparatus reduces the power consumption and increases the performance of an associated neural network.

According to a third aspect, there is provided a computer readable medium comprising instructions that, when executed by a processor, cause the processor to perform a method of operating an accumulation process in a data processing apparatus, the accumulation process comprising a plurality of accumulations which output a respective plurality of accumulated values, each based on a stored value and a computed value generated by a data processing operation, the method comprising: storing a first accumulated value, the first accumulated value being one of said plurality of accumulated values, into a first storage device comprising a plurality of single-bit storage elements; determining that a predetermined trigger has been satisfied with respect to the accumulation process; and in response to the determining, storing at least a portion of a second accumulated value, the second accumulated value being one of said plurality of accumulated values, into a second storage device.

Advantageously, the computer readable medium and instructions thereon, particularly the use of a predetermined trigger, provide a way to operate an accumulation process by determining when to switch from performing accumulations with respect to the first storage device to performing accumulations with respect to the second storage device. In this way, it is possible to control the number and frequency of reads and updates to the second storage device. Consequently, the computer readable medium reduces the power consumption and increases the performance of an associated neural network that relies upon said computer readable medium.

BRIEF DESCRIPTION OF THE DRAWINGS

Further features and advantages of embodiments will become apparent from the following description, given by way of example only, which is made with reference to the accompanying drawings.

DETAILED DESCRIPTION OF CERTAIN INVENTIVE EMBODIMENTS

Figure 1:
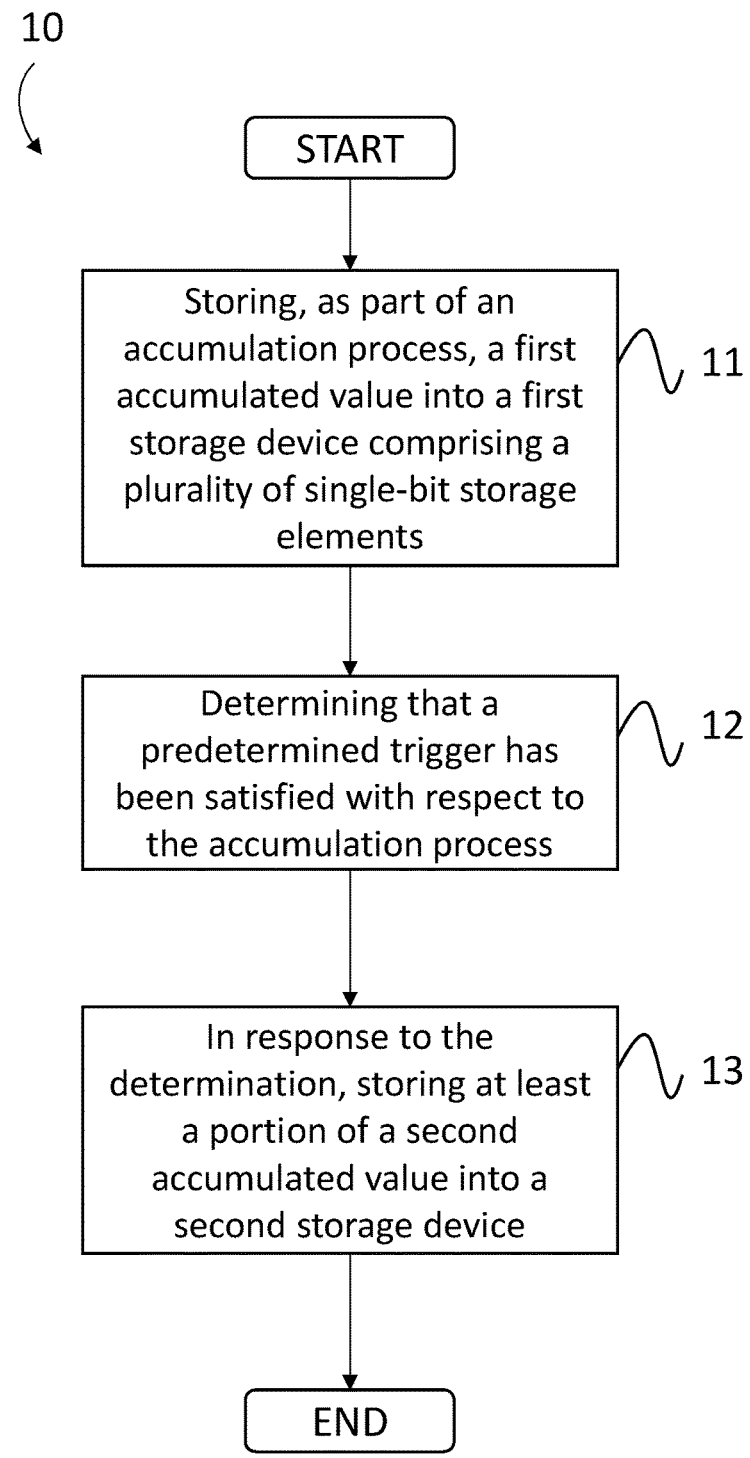
FIG. 1 is a flow diagram showing a method of operating an accumulation process in a data processing apparatus, according to an example.

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Overview of Operating a Data Processing Apparatus

A neural network, such as a convolutional neural network, CNN, comprises one or more layers, each containing a plurality of nodes. In traversing the network, multiple data processing operations (for example, accumulation processes) are performed within a particular layer to generate output data (for example, in the context of image analysis and/or classification, an output feature map (OFM)) for providing to a subsequent layer, based on: (i) input data (for example, in the context of image analysis and/or classification, an input feature map (IFM)) received from a preceding layer; and (ii) one or more weights associated with the nodes of the particular layer. In some cases, the layers of the CNN may be fully connected layers that generate probabilities rather than IFM and OFM.

The number of data processing operations carried out as part of executing such a neural network is very large, often being in the order of millions of operations. Accordingly, maintaining and reusing data within the network is a key factor to reducing the power consumption and increasing the performance of the neural network, especially when the data processing operations require decoded data. Accumulation logic can be configured to compute multiple outputs or as many outputs as possible from the same inputs (in other words, re-use the inputs to generate multiple outputs) and/or reuse weight data to reduce the frequency of reading in input data and weight data, respectively; reducing the frequency of reading in data reduces the cost and power of bringing data in, whilst generating a large number of partial accumulations that require storage. In order to re-use data and maintain a large number of results of the aforementioned data processing operations, a large memory array is used to accumulate and store results of the data processing operations. Static Random Access Memory (SRAM) is memory that could be used to store the results or partial results of said data processing operations because it has a low cost per bit of storage, however, it has limited bandwidth so may not be compatible with frequent updates and has addressing restrictions, often limited to accessing one row at a time. As an alternative, flip-flops are memory that could be used to store the results of the aforementioned data processing operations because they have lower access power and higher bandwidth than SRAM but have a higher cost per unit area.

One application of a neural network, such as the network discussed above, is to classify images, other examples, include image segmentation, speech recognition and depth estimation: mono-depth. In such a scenario, the weights associated with nodes of a particular layer represent kernels to be convolved with image data, such that weight data may therefore be considered to be kernel data and data input to the neural network, and, more specifically, a layer thereof, is image data representative of at least a portion of an image to be classified by the neural network. The image data can be in any suitable format and may, for example, represent pixel intensity values for respective pixels of an image. The image data may include data for each of a plurality of color channels, such as the red, green and blue color channels.

The inventors of the subject application have devised a method of operating an accumulation process in a data processing apparatus and corresponding accumulation schemes, methods, systems, and apparatus described herein that are configured to use various memory schemes to store data in order to reduce the power consumption and increase the performance of an associated neural network.

FIG. 1 is flow diagram of a method 10 of operating an accumulation process in a data processing apparatus comprising a plurality of accumulations, according to an example. The plurality of accumulations output a respective plurality of accumulated values, each based on a stored value and a computed value generated by a data processing operation. The method 10 is implemented by a data processing apparatus, such as the data processing apparatus 400 depicted in, and described in relation to, FIG. 2.

The method 10 starts at block 11 where a first accumulated value, being one of the plurality of accumulated values, is stored into a first storage device comprising a plurality of single-bit storage elements. The first accumulated value is a result of an accumulation based on a value generated by the data processing operation (for example, a multiplication operation) and a stored value (for example, a value resulting from a prior accumulation).

The method 10 then proceeds to block 12 where it is determined that a predetermined trigger has been satisfied with respect to the accumulation process.

Next, at block 13, in response to the determination of block 12, a second accumulated value, or a portion thereof, is stored into a second storage device. The second accumulated value is a result of an accumulation based on the first accumulated value.

The method 10, and particularly the use of a predetermined trigger, provide a way to control an accumulation process by determining when to switch from performing accumulations with respect to the first storage device to performing accumulations with respect to the second storage device. In this way, it is possible to control the number and frequency of reads and updates to the second storage device.

In some examples, the method 10 also comprises the respective accumulations of the first and second accumulated values, such as, accumulating the first accumulated value.

Figure 2:
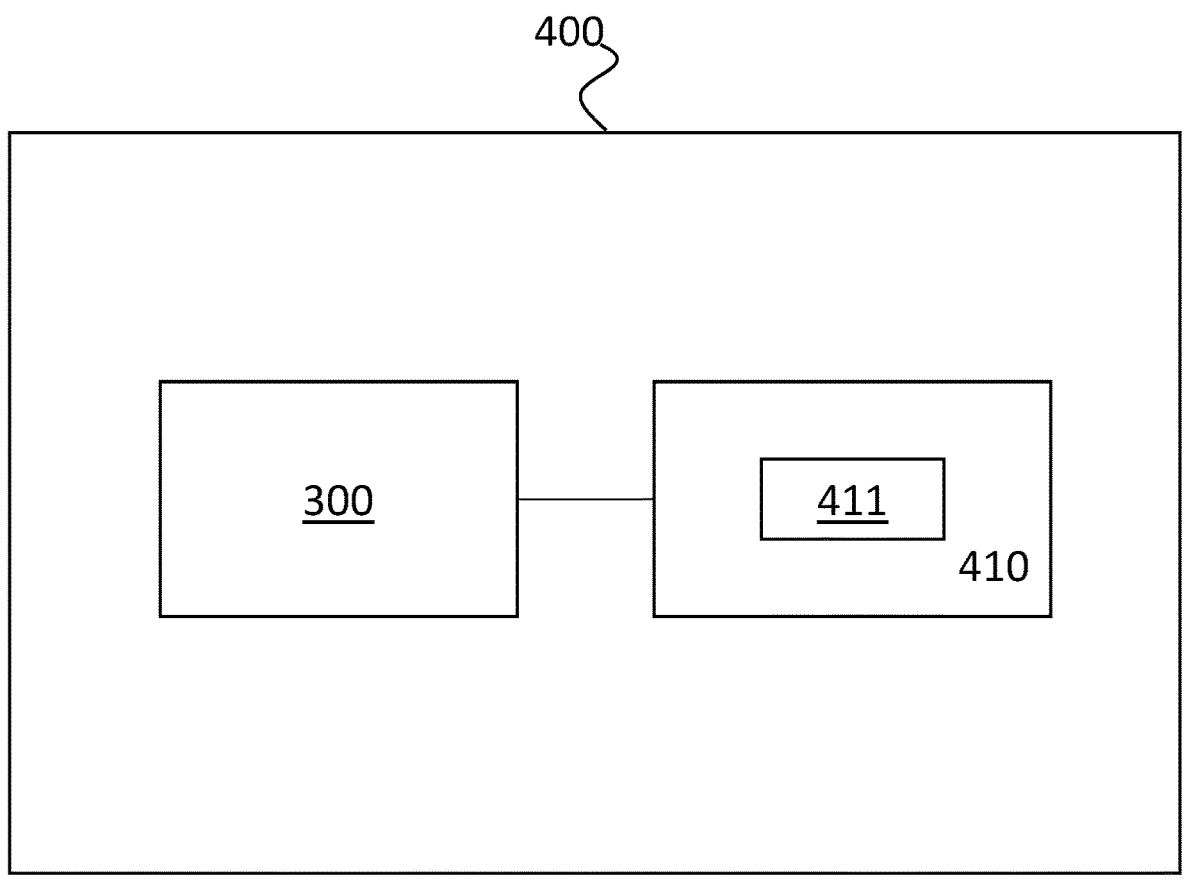
FIG. 2 is a schematic diagram of a data processing apparatus configured to implement the operation method of FIG. 1, according to an example.

FIG. 2 is a schematic diagram of a data processing apparatus 400 configured to implement the method 10 of FIG. 1, according to an example.

The data processing apparatus 400 comprises a computer readable medium 410 and a data accumulation system 300. The computer readable medium 410 comprises instructions 411 executable by the data accumulation system 300 for performing the method 10.

Figure 3:
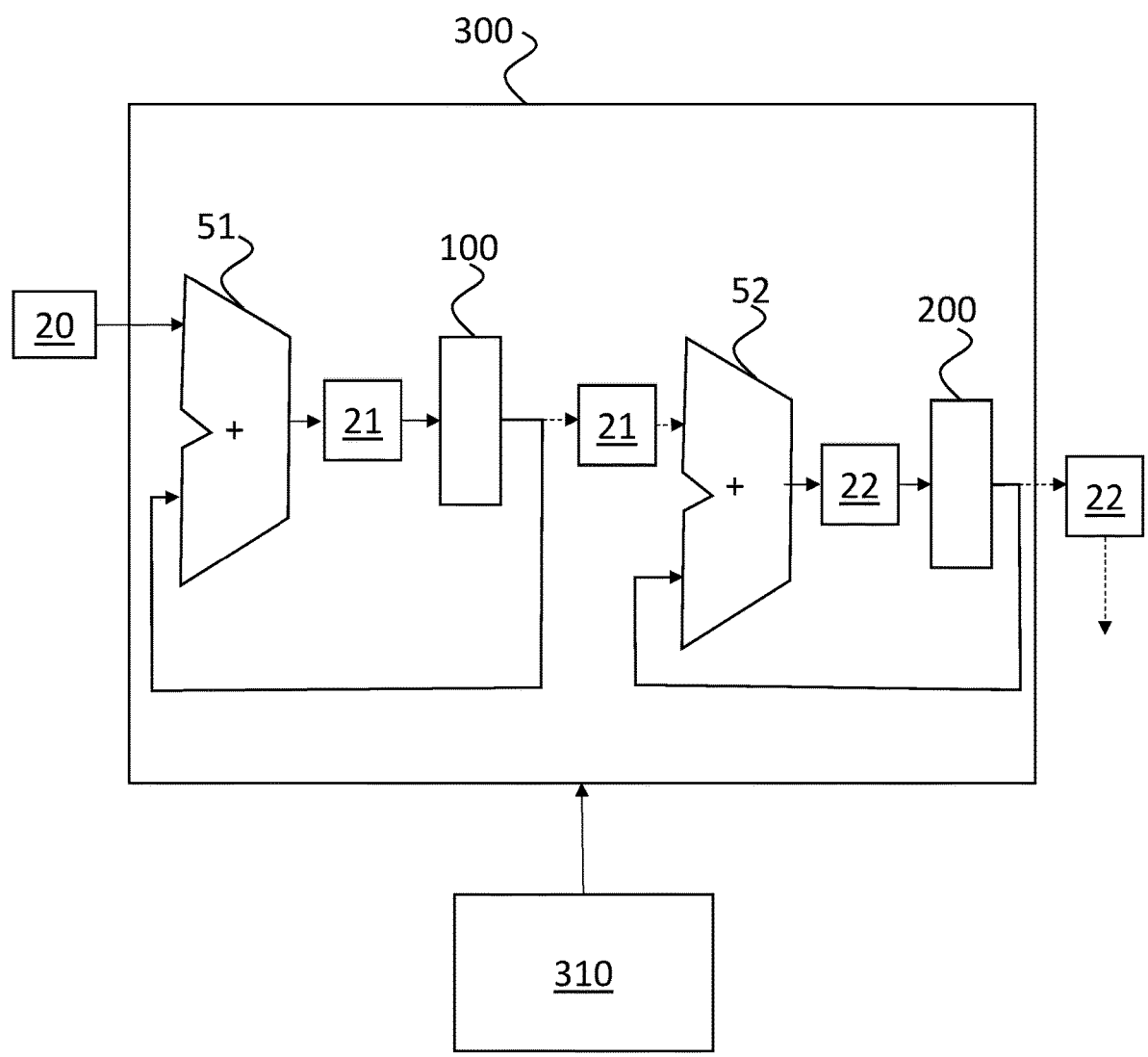
FIG. 3 shows a schematic diagram of a data accumulation system, according to an example.

FIG. 3 is a schematic diagram of the data accumulation system 300 of FIG. 2, according to an example. The data accumulation system 300 is coupled to a control system 310 that comprises control logic.

A value 20 is a computed value generated by a data processing operation and input to a first accumulation unit 51. In one example, the data processing operation is a multiplication operation performed by a multiplication unit (not shown), where the value 20 is received from a register or SRAM (also not shown). The input value 20 may be data used to implement a neural network, such as data relating to an IFM, a weighting of one or more nodes within a layer of the neural network, both, and a product thereof.

As part of operating an accumulation process comprising a plurality of accumulations, the first accumulation unit 51 is configured to accumulate the value 20 with a value retrieved from a first storage device 100 that comprises a plurality of single-bit storage elements, which may be flip flops. The retrieval of the value from the first storage device 100 may occur prior to the value 20 being received by the first accumulation unit 51. In some cases, the first accumulation unit 51 is a component of an arithmetic logic unit (ALU) together with the multiplication unit that provided the value 20, thereby forming a multiplier-accumulator (MAC) unit of an ALU.

The resultant value of the accumulation carried out by the first accumulation unit 51 is stored into the first storage device 100 as a first accumulated value 21. The storing of the first value 21 into the first storage device 100 serves to update the first storage device 100 by replacing the aforementioned value retrieved from the first storage device 100, sometimes referred to as the current value stored in the first storage device 100, with a newly accumulated value generated by the first accumulation unit 51. Accordingly, the first accumulation unit 51 and the first storage device 100 and the aforementioned interactions therebetween form an accumulation "loop" or "cycle" that serves to continuously update the value stored into the first storage device 100 per each value input to the data accumulation system 300.

A predetermined trigger is associated with the accumulation process and is a trigger for when any further accumulation of the plurality of accumulations is to be carried out by a second accumulation unit 52 of the data accumulation system 300, the second accumulation unit 52 being associated with a second storage device 200.

In one example, the predetermined trigger is based on a maximum value that the first storage device 100 can store, sometimes referred to as a maximum storable value. For example, if the first storage device 100 is an 8-bit storage device the maximum 8-bit unsigned number capable of being stored into the first storage device 100 is a value of 11111111 in binary (corresponding to the integer 255). In such a scenario, the predetermined trigger would be satisfied when the first accumulated value 21 is at least equivalent to (in other words, greater than or equal to) the integer 255. A carry or overflow bit may be set in the output of the first storage device 100 to indicate that the first storage device 100 is storing its maximum storable value or that the first accumulated value 21 exceeds the width of the first storage device 100. In other examples, the binary values may have one of the following formats: ones' complement; two's complement; −127 to +127; and −128 to +127. For signed numbers, the predetermined trigger may be based on a minimum storable value and/or a maximum storable value.

The second storage device 200 is understood to be a storage device configured to store overflow data from the first storage device 100 and is used, in this example, when the value being accumulated by the first accumulation unit 51 is too large to be fully stored into the first storage device 100. In this regard, the second storage device 200 may have a larger storage capacity than the first storage device 100 (in the scenario above, the second storage device 200 would store data having a data size larger than 8-bit (for example 12-bit, 16-bit, or larger) and/or is configured to store a portion of the second accumulated value that is not able to be stored in the first storage device 100, that is, the portion of the second accumulated value that is greater than the maximum value that the first storage device 100 can store. In keeping with the above unsigned number example, if the second accumulated value is a 9-bit value, the first 8-bits can be stored by the 8-bit first storage device 100 and it is only the $9^{th}$ bit that requires storing elsewhere: in the second storage device 200. This is particularly useful when the first storage device 100 is used for a large number of low-level accumulations but is stored in a memory level that is limited in size, for example, a register in a processor chip.

In another example, the predetermined trigger is based on a number of cycles, N, of accumulation performed with respect to the first storage device 100, irrespective of the values being accumulated. In such a scenario, the predetermined trigger is satisfied when a number of cycles of accumulation equivalent to the trigger, N, has been completed, in other words, when the value stored into the first storage device 100 has been updated N times.

In a slight variation, the predetermined trigger could correspond to a number N of total values being accumulated over a variable number of cycles or amount of time, rather than a number of accumulations. This would be useful in circumstances where the associated hardware has been configured to avoid accumulating zero values and thus does not update the value stored in the first storage device as a result of such an accumulation. Zero values are often used for weights in neural networks, so setting the trigger in accordance with the number of total values emphasizes the importance of the accumulated value and not the number of cycles of accumulation.

Alternatively, the predetermined trigger may be defined with respect to time, such that the trigger defines a time period, for example, 0.001 second, or a number of clock cycles in which accumulation with respect to the first storage device 100 occurs before switching to the second storage device 200. As for the cycle-based trigger, a time or clock-based trigger actively delays performing accumulation using the second storage device 200 and thereby reduces the frequency of updates performed with respect to the second storage device 200, so is useful when the second storage device 200 is more costly to access than the first storage device 100. A timer or counter component may be used to monitor the passing time.

Similar to the maximum storable value example, in a further example, the predetermined trigger may depend on a detection of overflow of the first storage device 100, that is, detection of when a carry or overflow bit is set in the first storage device 100.

Whilst being described in relation to separate examples, a plurality of the different predetermined triggers may be combined to define a predetermined trigger based on multiple conditions. For example, a first condition relating to the number of total values and a second condition relating to the maximum storable value, where, depending on the conditions, either both or one of the first and second conditions is required to be satisfied before the predetermined trigger is satisfied.

Use of a predetermined trigger, as in each of the examples described above, results in the accumulating and subsequent updating at the second storage device 200 occurring at a rate of 1/N relative to the N updates at the first storage device 100. This is particularly useful when the second storage device 200 is stored in a different location or memory level to the first storage device 100 that is more costly and/or time-consuming to access than the location of the first storage device 100. The number of cycles may be counted by a counter (not shown). In another example, a number of data processing operations providing a computed value is counted and used as the predetermined trigger.

Returning to FIG. 3, if it is determined that the predetermined trigger is not satisfied, the value stored into the first storage device 100 is continuously updated as more data processing operations are performed and new inputs are provided to the first accumulation unit 51 (previously referred to as an accumulation "loop" or "cycle"), until the predetermined trigger is satisfied.

If it is determined that the predetermined trigger is satisfied, the first accumulated value 21 is used as an input (depicted by the dashed arrows) to a second accumulation unit 52. The second accumulation unit 52 is configured to accumulate the first accumulated value 21 with a value retrieved from the second storage device 200, where the latter may be retrieved from the second storage device prior to receipt of the first accumulated value 21 by the second accumulation unit 52. The second accumulation unit 52 may be a component of an arithmetic logic unit (ALU), in some examples, together with the first accumulation unit 51 and the multiplication unit that provided the value 20 to form a multiplier-accumulator (MAC) unit of an ALU.

Notwithstanding whether the predetermined trigger is based on a maximum value of the first storage device 100, detection of an overflow bit, a number of cycles of accumulation, a number of total values, or defined with respect to time, the determination of whether the predetermined trigger is satisfied may be based on an expected result associated with the data processing operation that generated the value 20. The expected result being determined prior to the expected results being generated by the data processing operation. A size of an expected result may be indicated within metadata that is generated and provided with the data relating to the data processing operation, such as weight data input to the data processing operation. Receipt of the weight data and its metadata and subsequent calculation of an expected result may prompt gating or disabling of one or more bits of the second storage device. For example, where the weight is zero no multiplication operation is performed because the result would be zero; where the weight is <8 one or more bits (a subset), such as bits 15:13, of the second storage device may be gated; where the weight is <32 one or more bits (another subset), such as bits 15:12, of the second storage device may be gated; otherwise full range of the second storage device is used.

In an example in which the predetermined trigger is based on a maximum storable value of the first storage device 100, the expected result is a predicted size of a value resulting from the data processing operation or a prediction of a number of accumulations that can be carried out without triggering the predetermined trigger and then using (and activating) one or more bits of the second storage device. In such a scenario, the size prediction is used to indicate whether implementation of the data processing operation to generate the value 20 and the subsequent accumulation performed by the first accumulation unit 51 would cause the maximum value of the first storage device 100 to be met and, thus, the predetermined trigger to be satisfied (and the second storage device to be used for an accumulation). In one example, the expected result is generated based on analysis of a kernel to determine the product of a corresponding kernel value and a maximum input value, such as a maximum IFM.

Where the predetermined trigger is based on a number of cycles of accumulation, N, or a number of data processing operations, the forthcoming data processing operation to generate the value 20 is assigned a number by a counter that is compared to the trigger N to determine whether the subsequent accumulation by the first accumulation unit 51 would result in the trigger being satisfied. In addition, a current accumulated value stored in the first storage device 100 may be used as the basis for determining the number of accumulations or data processing operations to be executed before the second storage device 200 is required to store an accumulated value. As another example, certain bits of the first storage device 100 or the second storage device 200 may be monitored to determine whether they are set to zero (or LOW), which can be used to inform a prediction of when other, higher, bits within the respective storage device will change. In relation to a time-based trigger, a prediction is made as to the time it will take to carry out at least one data processing operation to generate value 20 and/or at least one subsequent accumulation to generate the first accumulated value 21. The predicted time is then compared to a current value of a timer to determine whether the predetermined trigger will be satisfied as a result of an accumulation cycle.

The resultant value, or a portion thereof, of the accumulation carried out by the second accumulation unit 52 is a second accumulated value 22 and is stored into the second storage device 200. The storing of the second value 22 into the second storage device 200 serves to update the second storage device 200 by replacing the aforementioned value retrieved from the second storage device 200, that is, the current value stored in the second storage device 200, with a newly accumulated value generated by the second accumulation unit 52.

In some examples, it is determined that a second predetermined trigger has been satisfied with respect to the second storage device 200. In such a scenario, the second accumulated value 22 stored into the second storage device 200 is output for use in a further data processing operation or read by a data processing operation, such as a multiplication or further accumulation operation. In one example, the second value may be an OFM or a probability.

The control system 310 comprises control logic configured to perform the method of operating the accumulation process including initiating accumulation using the second accumulation unit 52 in response to a determination that the predetermined trigger has been satisfied. In some examples, the control logic is arranged to determine the expected result of the data processing operation, as described above. The data accumulation system 300 may further comprise one or more components (not shown) configured to set and clear the values stored into the first accumulation unit 51 and the second accumulation unit 52, respectively. The one or more components could be one or more multiplexers. In such a scenario, the initiation of the clearing and/or setting actions are controlled by the control logic 310.

Figure 4:
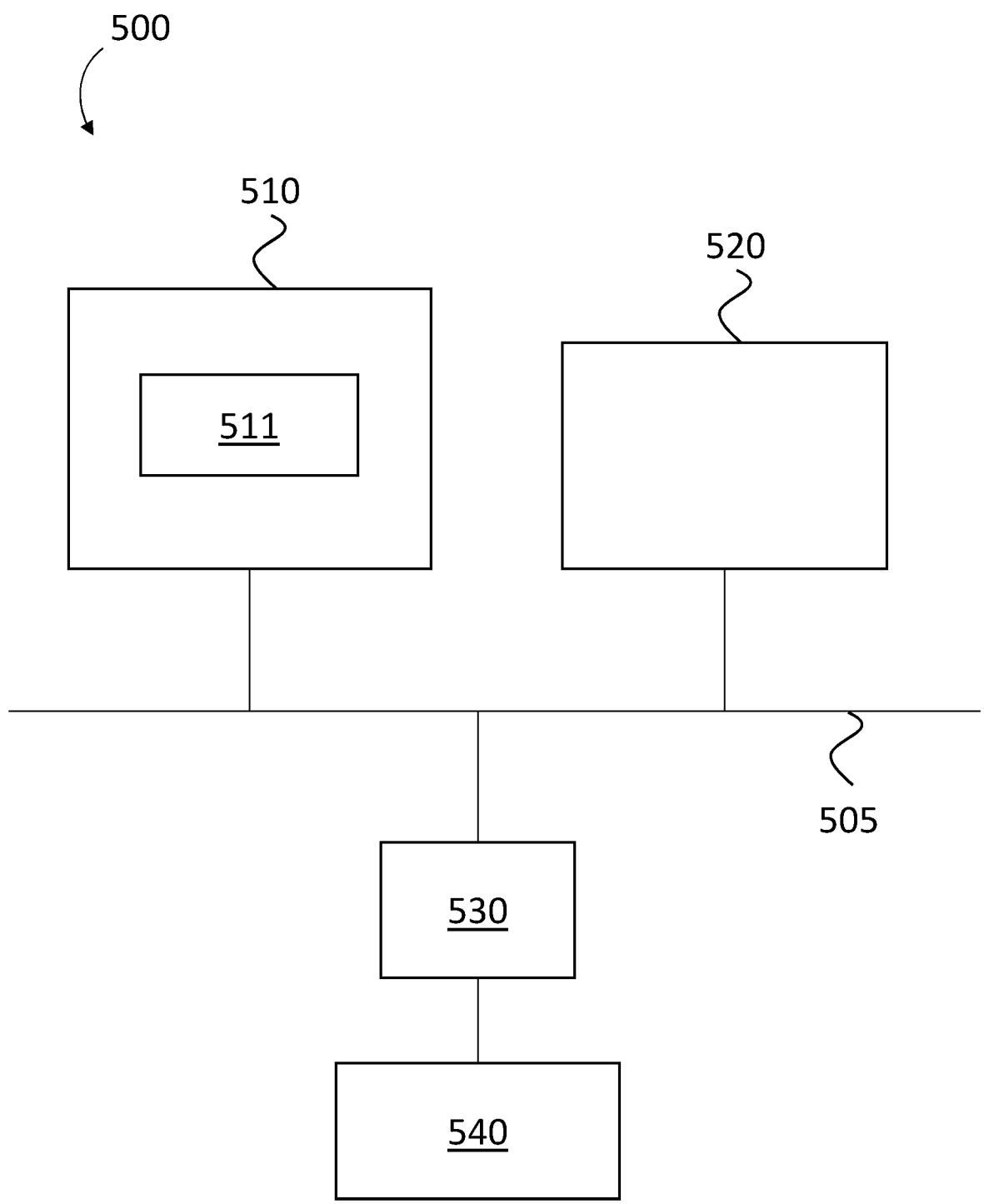
FIG. 4 shows a schematic diagram of a computing device for use with the method of FIG. 1 and the apparatus and system of FIGS. 2 and 3, according to an example.

FIG. 4 is a schematic diagram of a computing device 500 for use with the method 10 of FIG. 1 and the data processing apparatus 400 of FIG. 2. The computing device 500 may be one of a personal computer, a smartphone, a laptop, a tablet, a server, or an on-board computing device that coupled to or mounted within a vehicle.

The computing device 500 comprises at least one processor including a central processing unit, CPU, 510 having a driver 511, a neural network accelerator 520, also referred to as a neural processing unit (NPU), a dynamic memory controller, DMC, 530, and storage 540.

The data processing apparatus 400 of FIG. 2 is split between the neural network accelerator 520 comprising at least one data accumulation system 300, the CPU 510 comprising one or more of the instructions 411 read from the computer readable medium 410, and the storage 540 comprising the computer readable medium 410.

The neural network accelerator 520 is a processor configured to implement at least an inference phase, such as a classification or segmentation phase, of a neural network and sometimes a training phase. The neural network accelerator 520 comprises at least one data accumulation system 300 to implement the method 10 of FIG. 1. In some examples, a neural network is implemented using a more general processor, such as the CPU 510 or a GPU.

The driver 511 of the CPU 510 provides an interface between software configured to control or configure the neural network and the underlying hardware, for example, the instructions 411 of the computer readable medium 410 and the neural network accelerator 520 and control logic 311.

The DMC 530 is configured to control access to the storage 540 of the computing device 500. The storage 540 comprises the computer readable medium 410 of FIG. 2 and is, for example, external to the neural network accelerator 520 and may be a random-access memory (RAM) such as DDR-SDRAM (double data rate synchronous dynamic random-access memory). In other examples, the storage 540 may be or include a non-volatile memory such as Read Only Memory (ROM), non-volatile RAM (NVRAM) or a solid-state drive (SSD) such as Flash memory. The storage 540 in examples can include further storage devices, for example magnetic, optical or tape media, compact disc (CD), digital versatile disc (DVD) or other data storage media. The storage 540 may also be removable or non-removable from the computing device 500.

The components of the computing device 500 in the example of FIG. 4 are interconnected using a systems bus 505 arranged to allow data to be transferred between the various components. For example, an ARM® Advanced Microcontroller Bus Architecture (AMBA®) interface, such as the Advanced eXtensible Interface (AXI), may be used.

Figure 5:
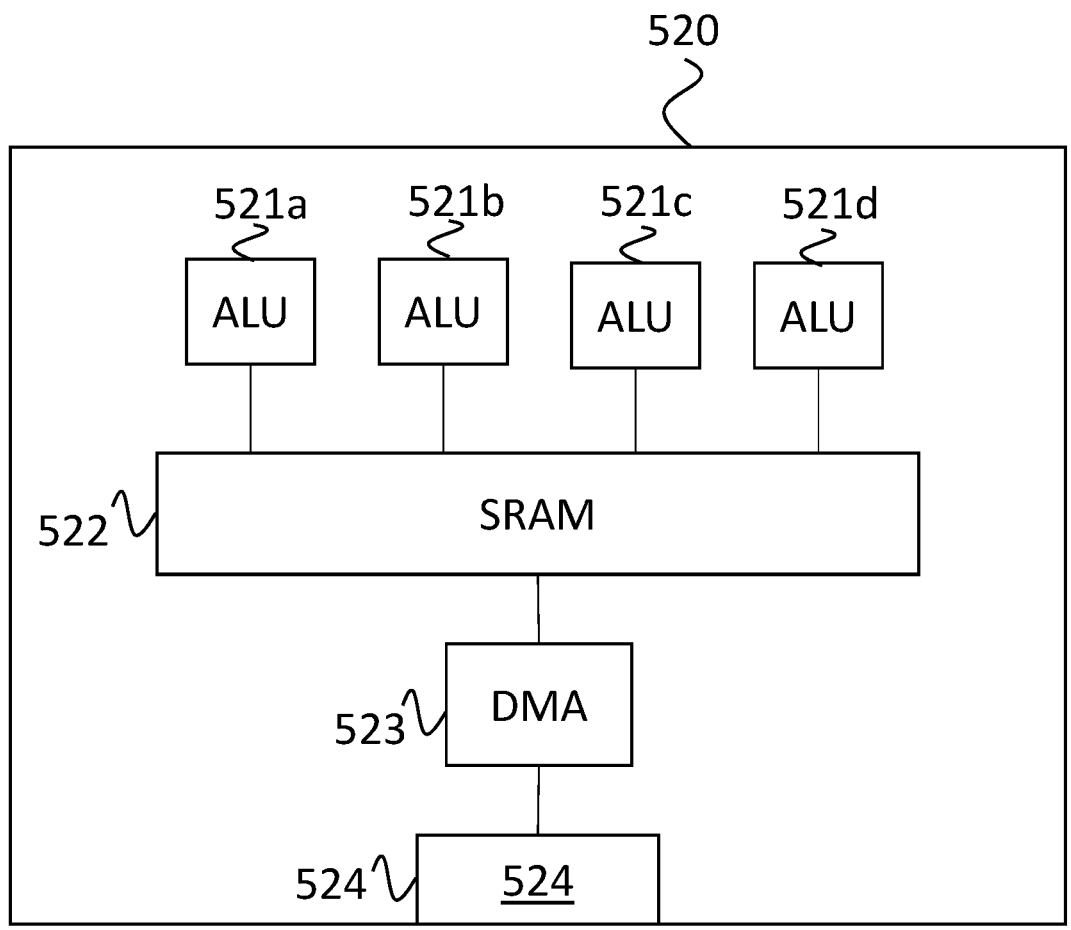
FIG. 5 is a schematic diagram of the neural network accelerator of FIG. 4, according to an example.

FIG. 5 is a schematic diagram of the neural network accelerator 520 of FIG. 4, according to an example.

The neural network accelerator 520 comprises a plurality of arithmetic logic units (ALU) 521a-d, Static Random-Access Memory (SRAM), 522, a direct memory access, DMA, 523, and an interface 524.

Each of the ALUs 521a-d comprise a data accumulation system, such as the data accumulation system 300 of FIG. 3 and are each arranged to perform a multiply-accumulate operation.

The interface 524 receives inputs to the neural network from other components of the computing device 500, such as the driver 511 of the CPU 510 or the storage 540. For example, the CPU 510 may include software configured to determine at least one parameter relating to a data processing operation arranged to be implemented by an ALU. The ALU typically includes at least one MAC unit (generally an array of MAC units), although other ALUs are possible. In general, an ALU is considered to be any electronic circuit that performs arithmetic and bitwise operations on binary numbers.

Other inputs which may be received by the neural network accelerator 520 via the interface 524 include input data, for example image data representative of an image to be classified using the neural network and kernel data representative of a kernel associated with the neural network after training. For example, the neural network is trained either by the computing device 500 or by an external computing device or computer system, for example using a GPU. The output of the training may be a plurality of kernels associated with a predetermined neural network architecture (for example with different kernels being associated with different respective layers of a multi-layer neural network architecture). The kernel data is considered to correspond to weight data representative of weights to be applied to image data, whereby each element of a kernel is considered to correspond to a weight, respectively. Each of these weights may be multiplied by a corresponding pixel value of an image patch, as part of the convolution of the kernel with the image patch.

The direct memory access (DMA) 523 allows the neural network accelerator 520 to access the storage 540 directly, independently of the CPU 510. This streamlines how the neural network accelerator accesses data stored by the storage 540 and thereby improves the speed at which the neural network accelerator 520 is able to perform classification of input data. For example, the neural network accelerator 520 may access inputs, to be input to the classification process, directly from the storage 540 (which may be main memory or system memory), without having to wait for the CPU 510 to be available. For example, the image data and the kernel data are stored into and retrieved from the storage 540 by the neural network accelerator 520.

The neural network accelerator 520 includes SRAM 522, used to store inputs to classification or other processes implemented by the ALUs 521a-d. For example, the SRAM may be on-chip or local memory of the neural network accelerator 520, which is generally quicker to access than the storage 540. The SRAM can include a plurality of separate memories (understood to be separately addressable memories). For example, the image data may be stored in a different memory from the kernel data (although, in other cases, they are stored in the same memory).

Figure 6:
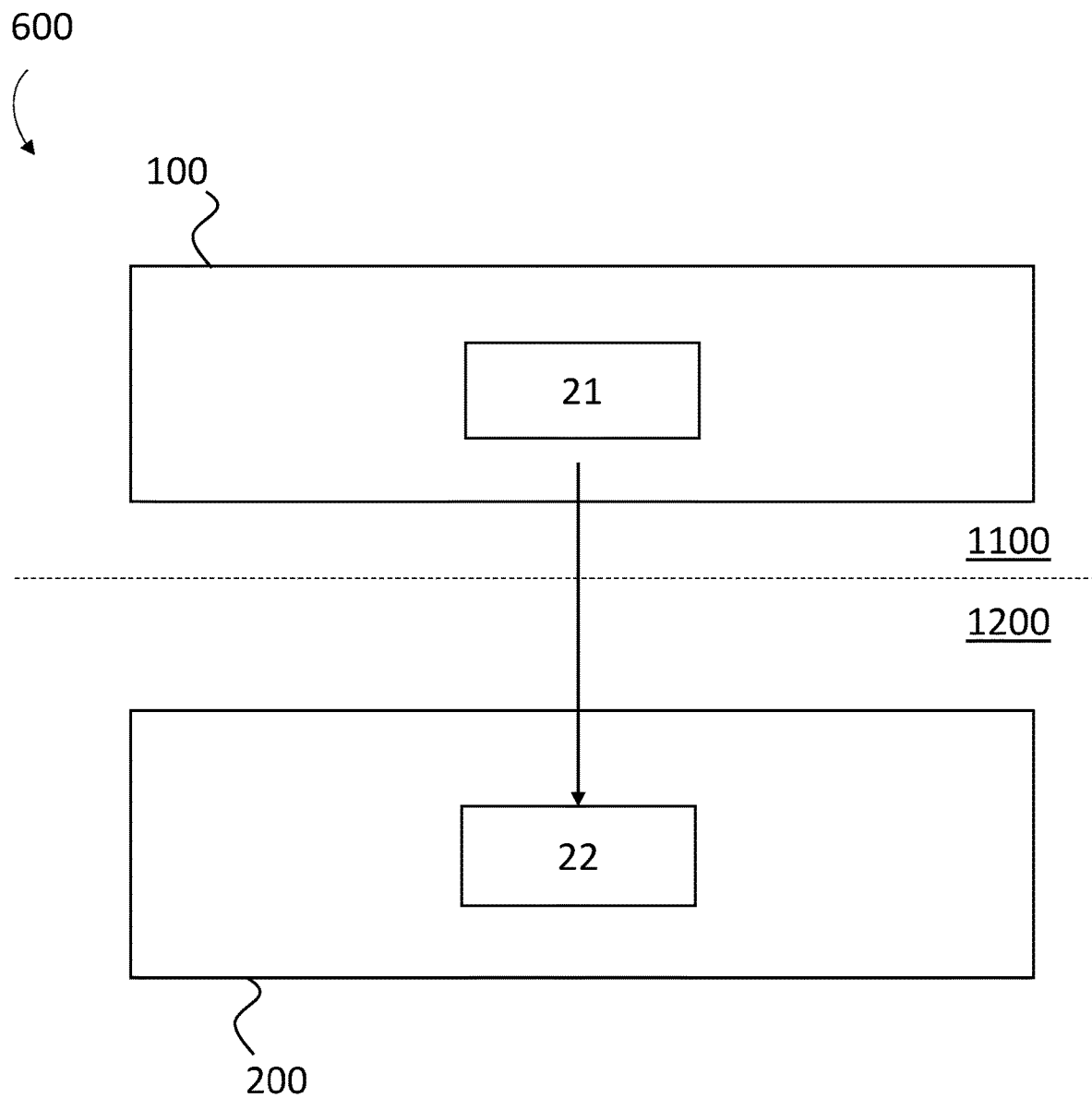
FIG. 6 is a schematic diagram of a multi-level memory scheme for a multi-level accumulation scheme, according to an example.

The method 10, the data processing apparatus 400, and the computing device 500 described in relation to FIGS. 1-5 are particularly useful in implementing accumulation schemes that decrease the cost and time of completing accumulation processes whilst increasing their efficiency, due to facilitating partial accumulations and storage thereof through the use of two storage devices in a memory scheme, where the second storage device is used in response to a predetermined trigger being satisfied. As a result, a neural network that incorporates accumulation logic configured to carry out those accumulation processes, as described above, runs more efficiently and is able to reuse data and rely on a large volume of partial accumulations in a manner that is less costly and less time consuming. The following sections describe a multi-level accumulation scheme and a split-accumulation scheme that are designed to achieve the afore-mentioned optimizations, the multi-level accumulation scheme being designed with particular focus on reducing write and read rates to a storage device having limited bandwidth to more efficiently support the operation of partial accumulations and storage of results thereof Multi-Level Accumulation Scheme FIG. 6 is a simplified schematic diagram of a multi-level memory scheme 600 for a multi-level accumulation scheme, according to an example. The multi-level memory scheme 600 comprises a tiered memory system having a primary memory level 1100 (depicted above the dashed line) and a secondary memory level 1200 (depicted below the dashed line). The first storage device 100 is in the primary memory level 1100. The second storage device 200 is in the secondary memory level 1200.

The primary memory level 1100 and the secondary memory level 1200 are different types of memory having different performance characteristics. In the example of FIG. 6, the secondary memory level 1200 is slower to access with a limited bandwidth compared to the primary memory level 1100 but can store more data. Accordingly, the herein described multi-level accumulation scheme is designed to support a large number of partial accumulations using logic that reduces an update rate to the secondary memory level, thereby reducing the power used to access the secondary memory level. Other performance characteristics that differ between the memory levels include at least one of the following: the cost per area for storing a bit; the bandwidth, the memory size, and the level of power required per access to the memory level. As a result, the hybrid memory scheme of FIG. 6 can be tailored to meet specific performance levels by controlling how the two different memory levels are relied upon and used by the data processing and accumulation operations of an associated neural network. In one example, the first and second storage devices 100, 200 may both comprise flip-flops having different performance characteristics. Alternatively, flip-flops may be used in the first storage device 100 and SRAM used in the second storage device 200.

Figure 7:
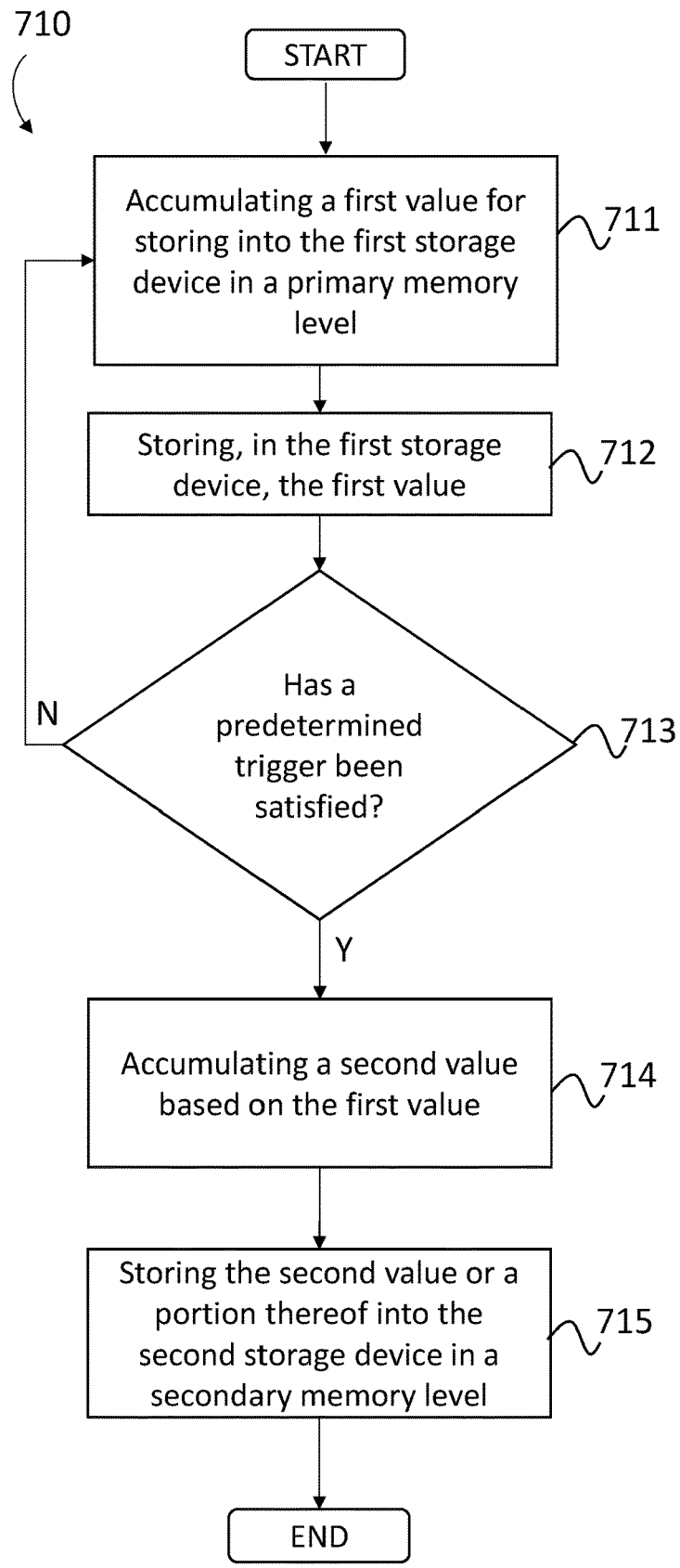
FIG. 7 is a flowchart of a method for performing a multi-level accumulation scheme, according to an example.

FIG. 7 is a flowchart of a method 710 for performing the multi-level accumulation scheme using the memory scheme 600 of FIG. 6. The method 710 is similar to and based upon the method 10 described in relation to FIG. 1 but is described with respect to the example of FIG. 6.

The method 710 starts at block 711 where a first accumulated value is accumulated for storing into the first storage device in the primary memory level 1100 based on a computed value generated by a data processing operation. Following this accumulation, at block 712, the first value is stored into the first storage device.

The method 710 then proceeds to block 713 where a determination is made as to whether a predetermined trigger has been satisfied. If the predetermined trigger is not satisfied the No, "N", branch is followed and the method 710 returns to block 711 where another cycle of accumulation with respect to the current value stored in the first storage device 100 and a value generated by a data processing operation is performed at blocks 711 and 712, followed by a further determination at block 713. In some scenarios, the "No" branch of block 713 is followed multiple times so that multiple accumulations N of a current value stored into the first storage device 100 and a plurality of values generated by respective data processing operations occur before the predetermined trigger is satisfied. In particular, where the predetermined trigger is a number of cycles of accumulation, N, the method 700 loops from block 711 to block 712 and on to block 713 N times (so the "No" branch is followed N−1 times) before the method 700 proceeds to follow the "Yes" branch of block 713.

If the predetermined trigger is satisfied the Yes, "Y", branch is followed and the method 710 proceeds to block 714.

At block 714, in response to the affirmative determination of block 713, a second value is accumulated based on the first value. The accumulation of the second value occurs at a rate 1/N relative to the number of cycles of accumulation N that occur to generate a value that enables the predetermined trigger to be satisfied.

The method then proceeds to block 715 where the second value, or a portion thereof, is stored into the second storage device in the secondary memory level 1200.

In some examples, after a predetermined number of accumulated values have been stored into the second storage device, the resultant accumulated value is processed to be suitable for further data processing operations. For example, the resultant accumulated value may be converted to an 8-bit or 16-bit integer value.

As discussed above, the predetermined trigger may be based on a maximum value that the first storage device 100 can store or a number of cycles, N, of accumulation carried out with respect to the first storage device 100. The maximum value trigger can be used in a situation where a large volume of smaller accumulations is being performed, so that the primary memory level 1100 can be used for the bulk of the operations before accessing the secondary memory level 1200. Similarly, the number of cycles trigger can also be used in a situation where a large volume of smaller accumulations is being performed, where the number of cycles N may be an estimated number of cycles of accumulation that result in the first storage device 100 storing a value that is equal to or within proximity of the maximum value that the first storage device 100 can store. In one example, the number of cycles N is four (4) or eight (8).

In either scenario, the assessment of the predetermined trigger following an accumulation using the first storage device 100 in the primary memory level 1100 limits the frequency of accesses and subsequent updates to the second storage device 200 in the secondary memory level 1200, which is slower and requires more power to access than the primary memory level 1100. In this way, a higher number of accumulation operations are carried out using the primary memory level 1100 compared to the secondary memory level 1200, which reduces the external read traffic and energy cost per accumulation because the number of accesses to the secondary memory level is reduced.

After the second accumulation operation based on the first value is carried out (for example, the accumulation of block 714), the first value may be cleared from the first storage device 100 so that a new cycle of multi-level accumulation can occur after the second storage device 200 has been updated (for example, by the storing of block 715).

Figure 8:
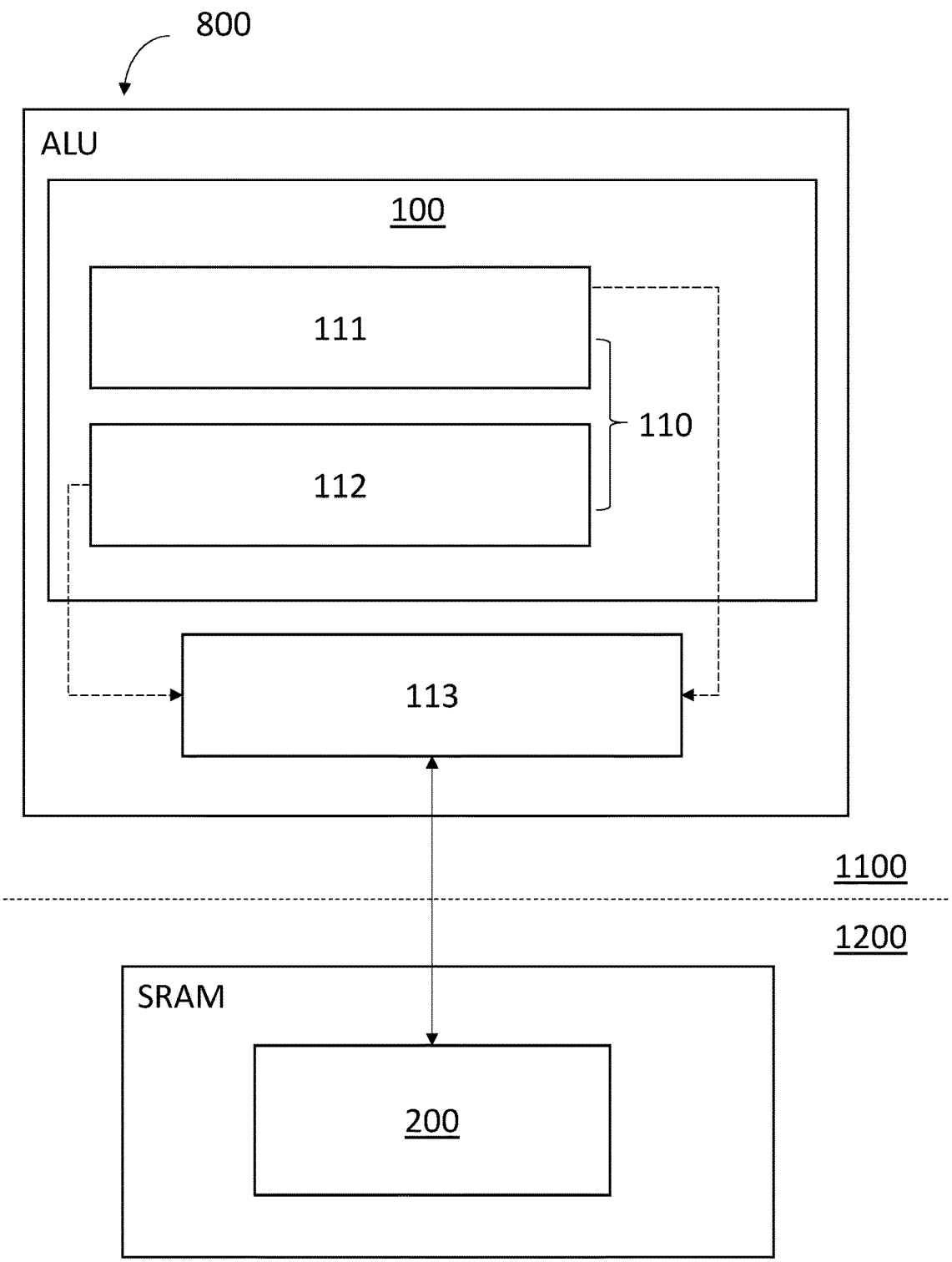
FIG. 8 is a further schematic diagram of a multi-level memory scheme for a multi-level accumulation scheme, according to an example.

FIG. 8 is a schematic diagram of a multi-level memory scheme 800 for a multi-level accumulation scheme, according to an example. In the example of FIG. 8, an ALU, such as one of the plurality of ALUs 521a-d of the neural network accelerator 520 of FIG. 5, comprises the primary memory level 1100 (depicted above the dashed line) and SRAM, such as the SRAM 522 of the neural network accelerator 520 of FIG. 5, comprises the secondary memory level 1200 (depicted below the dashed line), which has a higher bit density than the ALU, so can store more accumulators and thereby facilitates greater data reuse of input data, but is slower to access than the ALU.

In other examples, SRAM comprises the primary memory level 1100 and storage external to the neural network accelerator 520 comprises the secondary memory level 1200.

Returning to the example of FIG. 8, the ALU comprises the first storage device 100 and an intermediate storage device 113, for example, an adder array. The first storage device 100 comprises a plurality of registers 110 including a first register 111 and a second register 112. In one example, the first and second registers 111 and 112 are 29-bit accumulators.

The first register 111 and the second register 112 are each associated with respective predetermined triggers. Both registers are configured to alternately accumulate and subsequently store successive values, based on values generated by respective data processing operations, until their associated predetermined triggers are satisfied, at which point the current value of the register is read into the intermediate storage device 113 of the ALU. In another example, the intermediate storage device 113 is located external to the ALU, for example, in the secondary memory level.

The SRAM comprises the second storage device 200, which in some examples, forms part of a buffer. The intermediate storage device 113 is configured to fetch a current value of the second storage device 200 from SRAM and accumulate said value with a value that has most recently been read into the intermediate storage device 113 from one of the registers 111 and 112. The intermediate storage device 113 is further configured to write the accumulated value back into the second storage device 200 and thereby update the second storage device 200.

The first register 111 and the second register 112 are configured to alternate between at least two phases: an accumulating and storing phase (sometimes referred to as an "active" phase); and a reading-out phase (sometimes referred to as an "inactive" or "holding" phase). The first register 111 is configured to accumulate and store a value (in its active phase), based on a value generated from a data processing operation, until its predetermined trigger is satisfied, then the current value of the first register 111 is read into the intermediate storage device 113 (in its inactive phase). Whilst the current value of the first register 111 is being read out (the first register being in the reading-out phase), the second register 112 commences accumulation and storing of a third value (in its active phase) based on a value generated by a second data processing operation until its predetermined trigger is satisfied. Accordingly, the accumulating and storing phase of the first register 111 occurs concurrently with at least part of the reading-out (inactive) phase of the second register 112, and vice versa. As a result, downtime or "stalling" of the ALU is reduced because at least one of the plurality of registers 110 is active at any point in time and the intermediate storage device 113 is either performing an accumulation with respect to the first register 111 or with respect to the second register 112.

Taking the example of the first and second registers 111 and 112 being 29-bit accumulators, over 4 cycles, results of 64 4×8 multiplies are accumulated in the first register 111. The results of the multiplies may be shifted in order to use a 4×8 multiplier over several cycles to incrementally multiply larger numbers together. For example, two 8-bit numbers or two 16-bit numbers can be multiplied using this hardware in increments of 4 and 8 bits at a time and shifting and accumulating the result with prior results. In this way, multiplication of larger values can take place without requiring a larger multiplier to be built specifically for those larger values. Since multiply results can be shifted left by 4 or 8 to support different weight and activation precisions, the total number of bits per register is 29. After 4 cycles, the current register, register 111, is dumped or read to the intermediate storage device 113 and the second accumulator register 112 is cleared and used for the next 4 cycles. The register size of the first and second registers 111 and 112 is calculated to handle the most positive/negative value that could be accumulated through a series of N 4×8 multiplies with shifts, in the above example, a 29-bit register was calculated to handle the 64 4×8 multiplies.

In some examples, the intermediate storage device 113 receives values from a plurality of ALUs, within one or more neural network accelerators (for example, one or more data processing units, DPU), and accumulates those values with a value retrieved from the secondary storage device 200.

The secondary storage device 200 may support one of the following formats: 40-bit integer; 32-bit integer; and 16-bit floating point (explained in more detail in the following section).

Floating Point Value Format

To further reduce memory footprint of the multi-level accumulation scheme and associated memory scheme 600, a format used to store data in the secondary memory level 1200 can be different to a format used to store data in the primary memory 1100. For example, the second storage device 200 can store data representative of an integer in a format adapted to reduce the number of bits required to store the data representative of the integer, such as a floating-point binary format that reduces the number of bits in each accumulator within the secondary memory level 1200 from, as an example, 40 or 32 bits to 16 bits.

In this way, less memory space of the secondary memory level 1200 (for example, SRAM) is used to store each individual integer accumulated within the primary memory level 1100 (for example, 16-bit storage can be used within the secondary memory level 1200, rather than 32-bit or 64-bit storage). This means that the amount of available capacity in the secondary memory level 1200 is increased, which results in the secondary memory level being able to store a greater number of accumulators and thus integers and thus be advantageous for use in storing a large number of partial accumulations resulting from re-using data (for example, weight or IFM data).

For such cases, a converter is configured to convert a floating-point binary value retrieved from the second storage device 200 into an integer binary value prior to accumulating said value with a value in the primary memory level 1100. The converter sits logically between the first and second storage devices 100 and 200 and may be within the primary memory level 1100, for example, a component of an ALU.

Following the conversion, an accumulation in integer space can be carried out based on the converted integer and an integer accumulated into the first storage device 100 (previously referred to as the "first value"). The accumulation generates an accumulated integer value (previously referred to as the "second value") that is converted by the converter back to the floating-point binary format and written into the second storage device 200 in the secondary memory level 1200. The conversion of the value stored into the second storage device to integer format prior to the accumulation means that said value is precise and that precision is lost only when converting back to floating point format. In this way, there is no additional error introduced when converting from the floating point binary format to the integer format compared to a scenario in which the integer value stored into the first storage device 100 is converted to floating point integer format prior to the accumulation and the accumulation is carried out in floating-point space. For the latter, there would be two places where rounding occurs (and thus imprecision introduced): in the conversion and in the accumulation.

The format of a floating-point binary value is split into the following parts: a sign, a mantissa (sometimes referred to an "significand"), and an exponent. The mantissa represents the magnitude of the integer and comprises a bit representative of the sign (positive/negative) of the integer and other bits to represent the significand part of the integer. The exponent defines the position of the decimal point within the integer. The number of bits separately assigned to the mantissa and the exponent parts affects the precision and range of the integer: the greater number of bits assigned to the mantissa increases the precision and the greater number of bits assigned to the exponent increases the range. The overall number of bits used for the floating-point format affects the size of the second storage device 200.

In the context of accumulation operations performed by a data processing apparatus, a certain level of precision is required so as not to lose smaller numbers being added to an already accumulated value. In addition, as an accumulated value increases in size a certain range is required to be able to represent the results of further accumulations. Accordingly, the format of a floating-point binary value is based on a desired level of precision and range.

Figure 9:
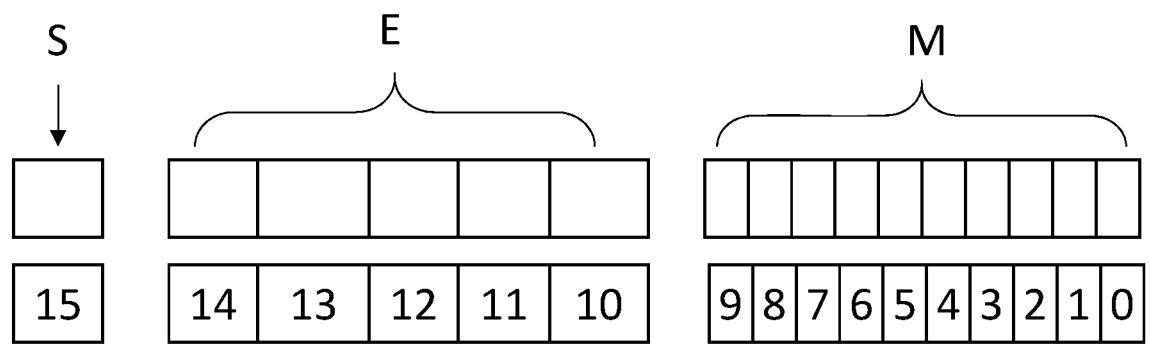
FIG. 9 is a schematic representation of a floating-point format, according to an example.

FIG. 9 is a schematic representation of a floating-point format, according to an example. The floating-point format of FIG. 9 is a 16-bit format, as follows: 10 bits (mantissa, M); 5 bits (exponent, E); and 1 bit (sign, S), which can be referred to as s5.10 format. The exponent has a bias of −1. The maximum representable magnitude is based on the maximum of the 10-bit mantissa, including an implicit leading 1 (in bold): 111 1111 1111, which is an 11-bit integer value of 2047; multiplied by the exponent $2^{30}$ to equal $1.999023*2^{40}$. The s5.10 format is designed to represent a non-fraction 40-bit integer value, so has the range of $-2^{39}-1$ to $+2^{39}-1$. This means the decimal point is not moved and the s5.10 format is useful for storing the results of accumulations where the largest accumulated value is less than or equal to $2^{39}-1$.

In an alternative example, another 16-bit floating-point format may be used having: 9 bits (mantissa, M); 6 bits (exponent, E); and 1 bit (sign, S), referred to as s6.9 format.

The s6.9 format is less precise than the s5.10 format because it has less mantissa bits but has a larger range because the s6.9 format has more exponent bits than the s5.10 format. A known floating-point format referred to as bfloat16 (brain floating point) has more range but less precision that the s5.10 format described above. The more precise s5.10 format is especially useful for an accumulation process using image data because small variations in the accumulated values can result in inaccuracy in the image data used for pixels.

In converting an accumulated integer value to the floating-point format, such as the s5.10 format, one or more rounding operations may be used to save area in the second storage device 200. In one example, a round-to-odd rounding operation rounds the mantissa values, which saves area in the second storage device 200 whilst being less costly than other rounding operations that typically require more mantissa or sign bits in order to be implemented, such as round to nearest (either tie on even or away from zero on even), round towards zero, round towards positive infinity, and round towards negative infinity.

Split-Accumulation Scheme

Figure 10:
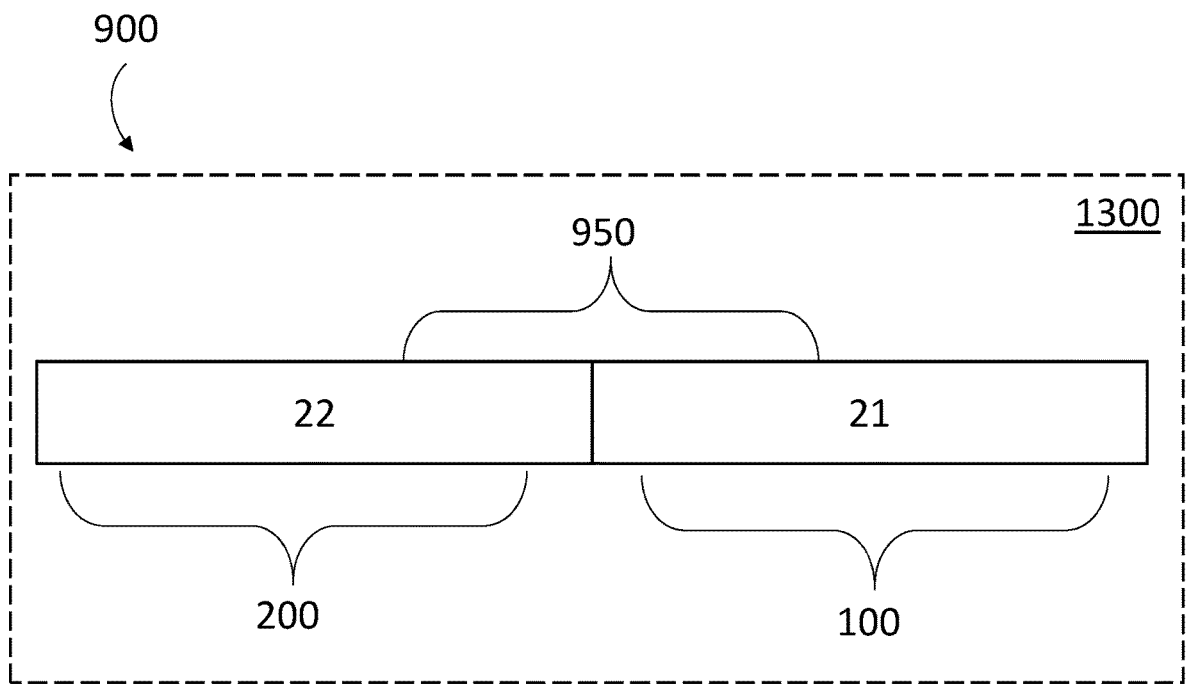
FIG. 10 is a further schematic diagram of a memory scheme for a split-accumulation scheme, according to an example.

FIG. 10 is a simplified schematic diagram of a memory scheme 900 for a split-accumulation scheme, according to an example. The memory scheme 900 comprises the first storage device 100 and the second storage device 200 within a single memory level 1300. The first storage device 100 and the second storage device 200 are arranged to form a two-part storage unit 950 that is configured to store binary values. Both the first and the second storage devices 100 and 200 comprise a plurality of single-bit storage elements.

The two-part storage unit 950 comprises M single bit storage elements, where M equals the number of single bit storage elements of the first storage device 100, P, plus the number of single bit storage elements of the second storage device 200, Q. That is: M=P+Q. In one example, the two-part storage unit 950 is a 32-bit storage unit, with the first storage device 100 being a 20-bit storage device and the second storage device 200 being a 12-bit storage device.

The memory level 1300 may comprise memory of an ALU, such as one of the plurality of ALUs 521a-d of the neural network accelerator 520 of FIG. 5. Alternatively, the memory level 1300 may comprise SRAM, such as the SRAM 522 of the neural network accelerator 520 of FIG. 5.

The two-part storage unit 950 is an accumulator: the first storage device 100 is a lower portion of the accumulator 950 and the second storage device 200 is an upper portion of the accumulator 950. The first storage device 100 comprises an adder and the second storage device 200 comprises an incrementor. In this way, higher-cost adder circuitry is limited to the first storage device 100, which, in the context of accumulation operations for a neural network, will be used to store a large volume of small (often partial) accumulations and subsequently be updated more frequently than the second storage device 200. As a result, the hybrid accumulator 950 of FIG. 10 is more cost effective than an accumulator comprising adder circuitry for each bit, including the higher bits that are used less frequently. In addition, the upper portion of the accumulator 950, that is, the second storage device 200, can be fully or partially switched off or set to an inactive or power-saving state for a number of accumulation cycles when the size of the resulting accumulations is such that the higher value bits of the second storage device 200, for example, bits 21-31 of the 32-bit accumulator 950, are not used to represent the accumulated value. The partial or full shutdown of the bits in the second storage device 200 contributes to power saving.

Figure 11:
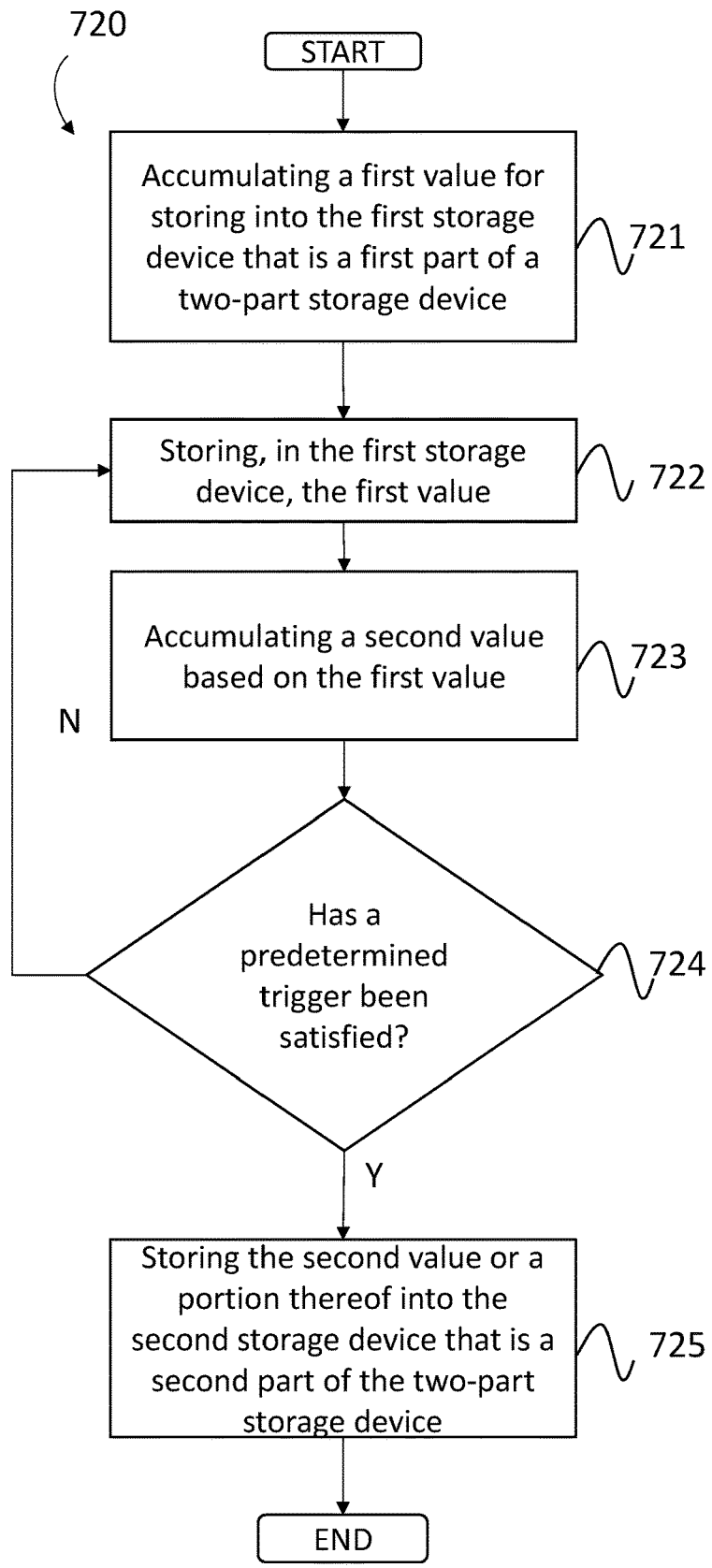
FIG. 11 is a flowchart of a method for performing a split-accumulation scheme, according to an example.

FIG. 11 is a flowchart of a method 720 for performing the split-accumulation scheme using the memory scheme 900 of FIG. 10. The method 720 is similar to and based upon the method 10 described in relation to FIG. 1 but is implemented in the context of the example of FIG. 10.

The method 720 starts at block 721 where a first value is accumulated for storing into the first storage device, which is part of a two-part storage unit (for example the storage unit 950 of FIG. 10), based on a value generated by a data processing operation. Following this accumulation, at block 722, the first value is stored into the first storage device.

The method 720 then proceeds to block 723 where a second value is accumulated based on the first value.

At block 724 a determination is made as to whether a predetermined trigger has been satisfied. If the predetermined trigger is not satisfied the No, "N", branch is followed and the method 720 returns to block 722 and the second value is stored into the first storage device. In one example, the second storage device 200 is maintained in a power-saving state until the predetermined trigger is satisfied.

As described in relation to FIG. 7, the "No" branch of block 724 is sometimes followed multiple times so that multiple accumulations N of a current value stored into the first storage device 100 and a plurality of values generated by respective data processing operations occur before the predetermined trigger is satisfied.

If the predetermined trigger is satisfied the Yes, "Y", branch is followed and the method 710 proceeds to block 725.

At block 725, in response to the affirmative determination of block 724, the second value, or a portion thereof, is stored into the second storage device that is part of the same two-part storage unit as the first storage device, for example, the storage unit 950 of FIG. 10. In one example, based on the positive determination, at least some bits of the second storage device 200 are placed into an active state from an inactive or power-saving state.

In one example the first storage device 100 is configured to store binary values and the second storage device 200 is configured to store Gray coded values, which reduces the number of bits to change within the second storage device 200 per accumulation to a single bit, thereby reducing toggling and saving power. For Gray coded values, the data processing operations are carried out in binary and the results are converted into Gray code form.

Figure 12:
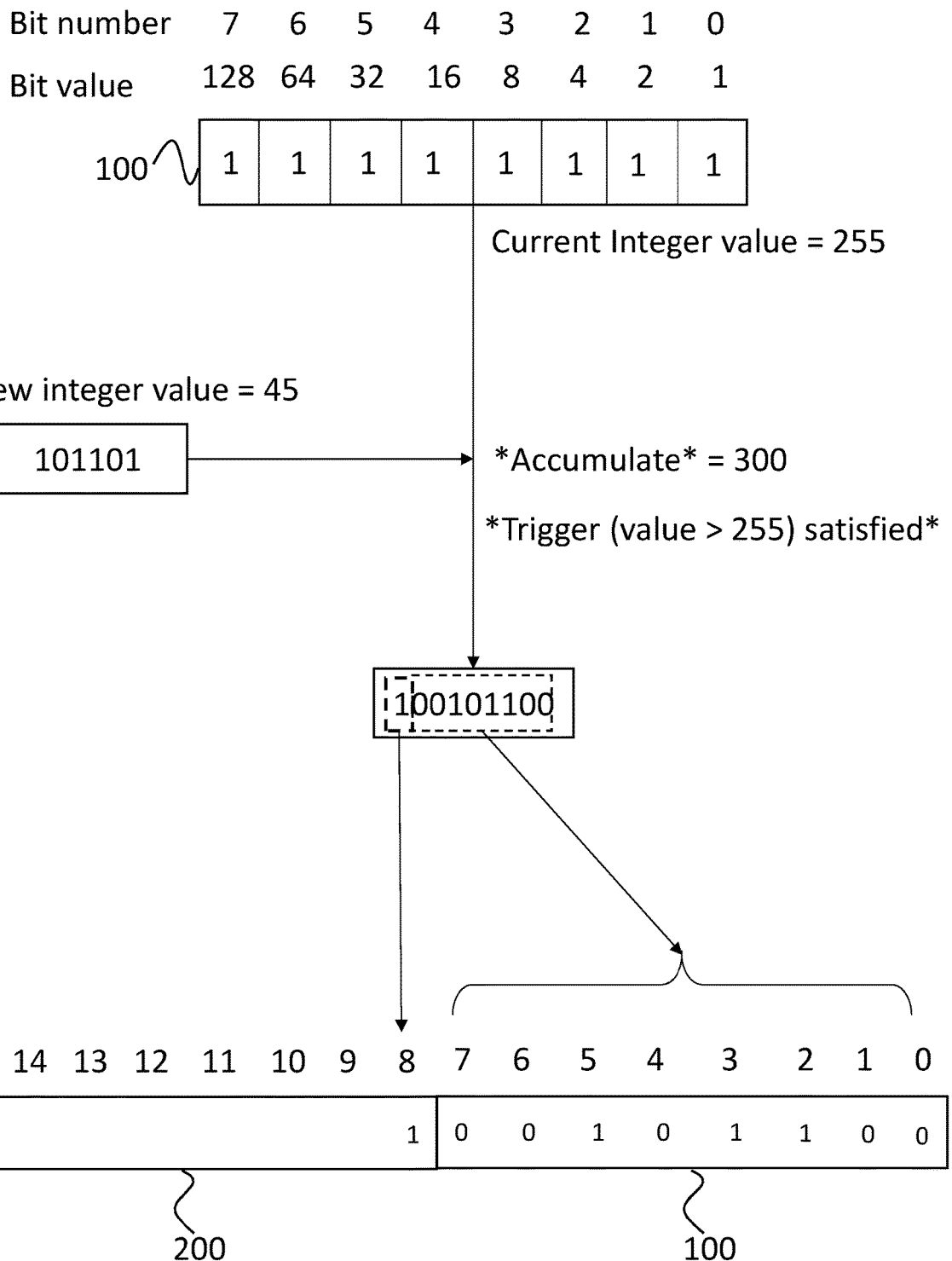
FIG. 12 is a further schematic diagram of the split-accumulation scheme, according to an example.

FIG. 12 is a simplified schematic diagram of the split-accumulation scheme, in accordance with method 720 using unsigned binary values.

In the example of FIG. 12, the first storage device 100 comprises a plurality of single-bit storage elements (bits 0-7) and is an 8-bit storage device. The first storage device 100 stores a current binary value 11111111 corresponding to a decimal value of 255 (in accordance with step 722 of FIG. 11). The current binary value 11111111 is the result of previous accumulations of values generated by data processing operations and the respective values of the first storage device 100. Since the first storage device 100 is an 8-bit storage device, the current binary value of 11111111 is the maximum value that the first storage device 100 can store. The predetermined trigger with respect to the first storage device 100 is a value being greater than the maximum value storable by the first storage device 100, that is, greater than decimal value 255 or binary value 11111111.

A further data processing operation generates a new binary value of 101101 corresponding to a decimal value of 45. The new binary value is accumulated with the current binary value of the first storage device 100 to generate a second value corresponding to decimal value 300: 100101100 (in accordance with step 723 of FIG. 11). Accordingly, due to the size of the second value being greater than the maximum storable value in respect of the first storage device (decimal value 255) and the 8-bit size of the first storage device 100, it is determined that the predetermined trigger with respect to the first storage device 100 is satisfied (in accordance with step 724 of FIG. 11) and a portion of the second value is stored into the second storage device 200 (in accordance with step 725 of FIG. 11). Specifically, it is the $9^{th}$ bit of the second value 100101100 (highlighted) that is stored into the first bit of the second storage device 200, also referred to as the $9^{th}$ bit of the accumulator 950, in both cases depicted as bit number 8 in FIG. 12.

In some examples, signed binary numbers are generated by data processing operations on which the split-accumulation scheme is based. Accumulating signed binary numbers often results in a large number of bit changes for a single accumulation as a consequence of a negative value changing to a positive value and vice versa. Each bit change requires the circuitry of the bit in question to use energy to cause the change, where multiple successive accumulations result in a number of bits toggling from 0 to 1 and back again, or vice versa, wasting energy. Accordingly, it is desirable to minimize the number of bit changes per accumulation in an effort to reduce energy consumption.

Figure 13:
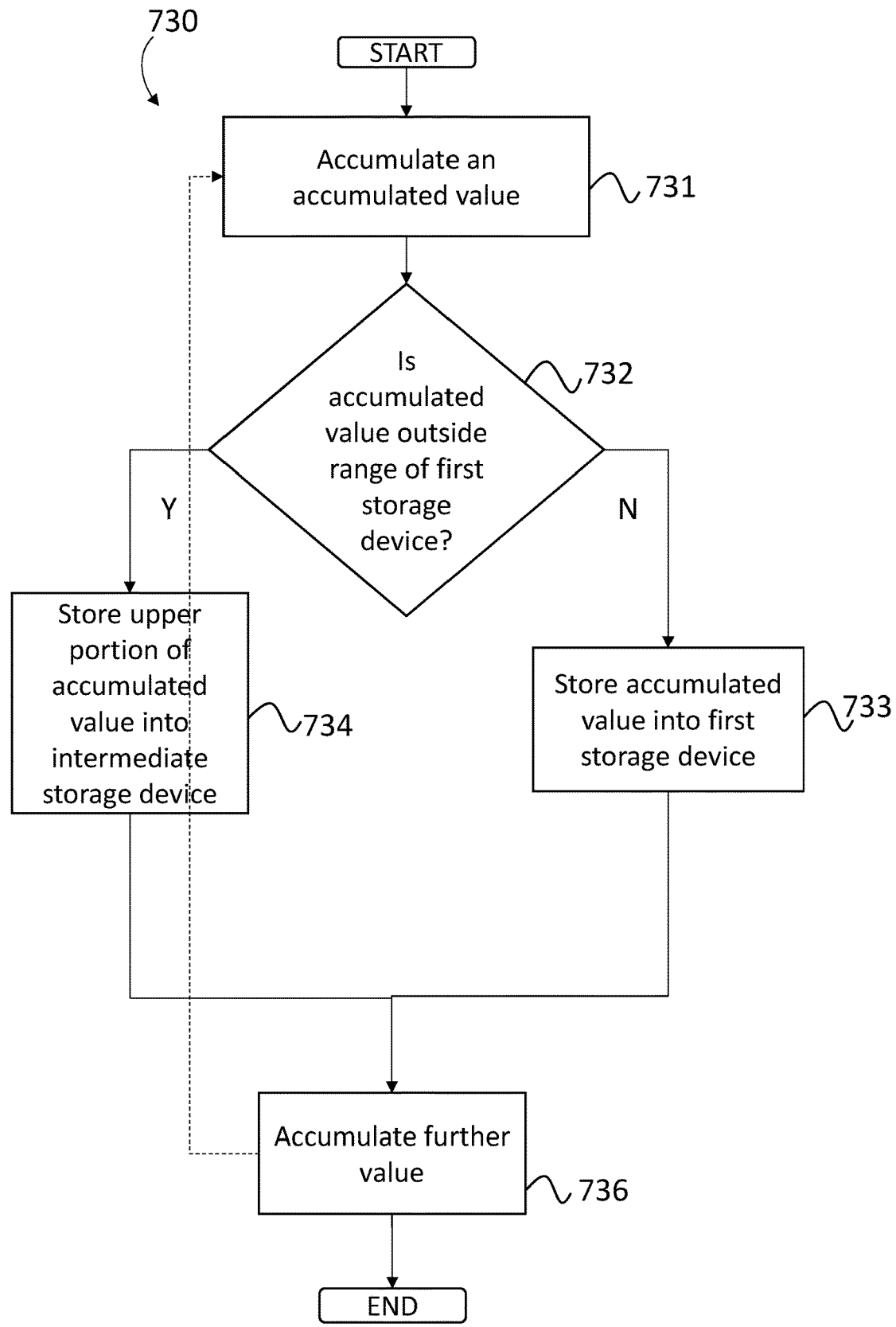
FIG. 13 is a flowchart of a method for performing the split-accumulation scheme, according to an example.

FIG. 13 is a flowchart of a method 730 for performing the split-accumulation scheme. The method 730 provides more detail to steps 724 and 725 of the method 720 of FIG. 11 in the context of signed binary values.

The method 730 begins at block 731 where an accumulated value, such as the second value in the aforementioned examples, is accumulated.

The method 730 then proceeds to block 732 where it is determined whether the accumulated value is outside a range of the first storage device 100.

If it is determined that the accumulated value is outside the range of the first storage device the yes, "Y", branch is followed to block 734. Over time, the first storage device accumulates values. If the accumulated value becomes too large to be stored into the first storage device, the accumulated value is understood to be outside the range of the first storage device, and thus "overflow", and an upper portion or the "overflow" is carried over to an intermediate storage device or buffer. The intermediate storage device stores the overflow, also referred to as a carry value, which is yet to be applied to the second storage device of the two-part storage device and the first storage device stores the lower portion of the accumulated value (for example, the first 8 bits), so the bits of the second storage device do not change. The intermediate storage device may be a single bit that stores a carry value of −1 or 0; applying this to the following example sequence of accumulations: −2, +2, −3, +7, the sequence of carry values stored by the intermediate storage device is: −1, 0, −1, 0.

Accordingly, the determination of step 732 can be understood to be an assessment of whether the first storage device has overflowed. Use of the intermediate storage device is beneficial because toggling of one or more bits (between "0" and "1") in signed calculations, particularly the first one or more bits of the second storage device 200, is avoided since the intermediate storage device acts as a buffer for accumulations of signed values. This helps to reduce power consumption of the accumulator 950 because each bit is not being updated every time an accumulation data processing operation takes place.

At block 734 an upper portion of the accumulated value, that is the overflow, is stored into the intermediate storage device. The method then proceeds to block 736 where a further value is accumulated and the method 730 returns to block 731 in respect of the further accumulated value. The use of the intermediate storage device and the cycling back with respect to further accumulations means that further small accumulations can be carried out and overflows thereof stored into the intermediate storage device without affecting the second storage device of the two-part storage unit 950, for example, without requiring the two-part storage unit 950 to change one or more bits of the second storage device from a power-saving state to an active or in-use state to represent a change from a negative to a positive value or vice versa. Consequently, in such scenarios, the second storage device is not used to store an accumulated value until an accumulated value exceeds the range of the intermediate storage device (explained in more detail below), thereby saving power.

If at block 732 it is determined that the accumulated value is not outside the range of the first storage device the no, "N", branch is followed to block 733. The method 730 then proceeds to block 736 where a further value is accumulated and the method 730 returns to block 731 in respect of the further accumulated value.

In some scenarios, the method 730 includes a determination of whether the carry value from the accumulated value (in other words, the overflow from the first storage device) exceeds the range of the intermediate storage device. This determination may occur at the same time as or subsequent to the determination of block 732. If the carry value is determined to be greater than the maximum value storable by the intermediate storage device, one or more bits of the second storage device 200 are activated and then incremented or decremented so that the accumulated value is stored, in its entirety, into the two-part storage unit 950. Following this, the intermediate storage device is set to zero.

Figure 14:
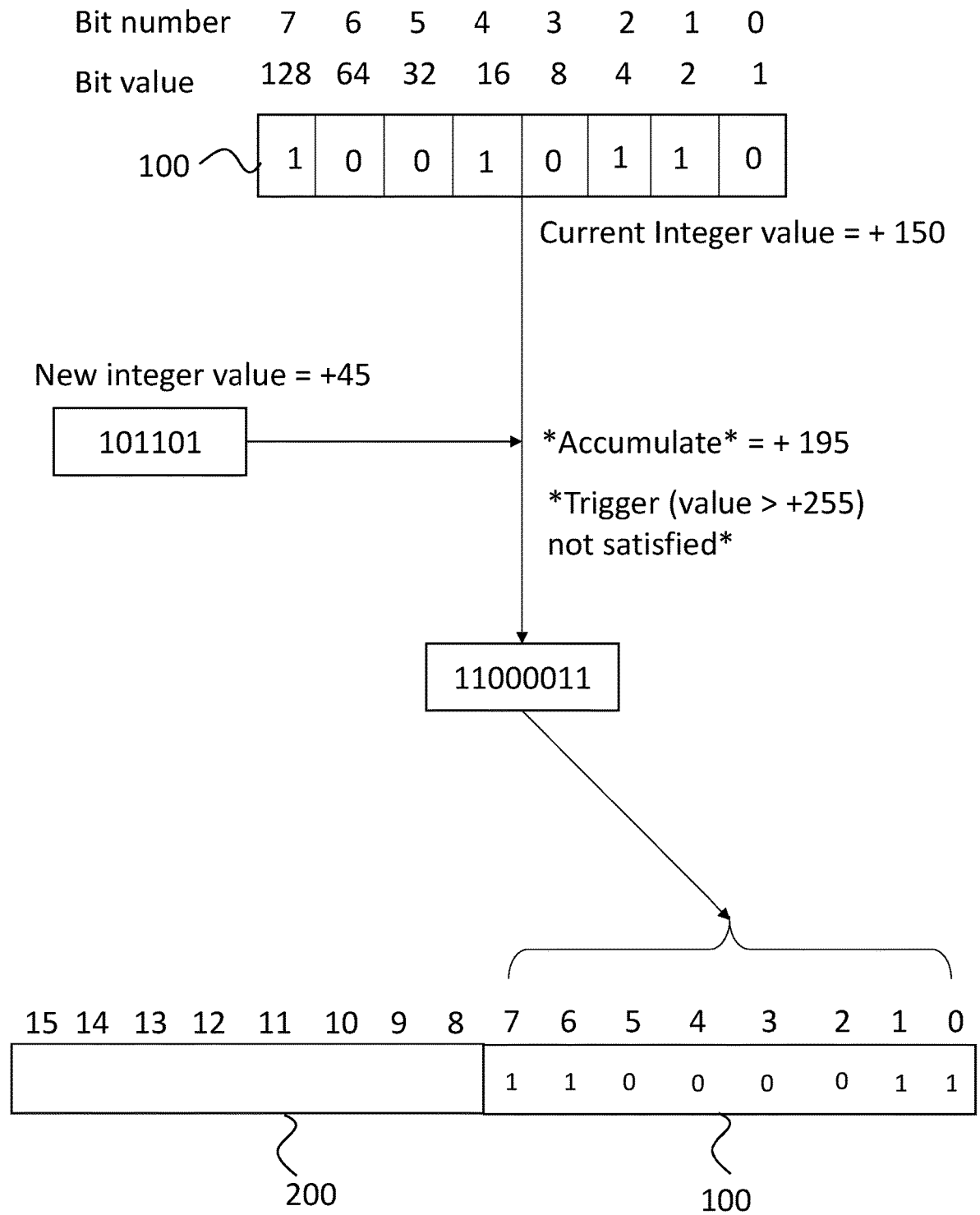
FIG. 14 is a further schematic diagram of a split-accumulation scheme, according to an example.

FIG. 14 is a simplified schematic diagram of the split-accumulation scheme, in accordance with method 730 using signed binary values.

The example of FIG. 14 is similar to the example of FIG. 12 in the size of the first storage device, the accumulations, and the numerical values on which the example is based, however, the example of FIG. 14 is based on signed binary values (indicated by the positive "+" signs in the figure).

In the example of FIG. 14, the predetermined trigger is the value of the first storage device 100 being more than the decimal value+255. The first storage device currently stores the integer value+150. The accumulated value+195 is less than the predetermined trigger and thus inside the range of the first storage device. Accordingly, the first storage device 100 stores the binary value 11000011 equivalent to integer+ 195 and an intermediate storage device is not used.

Figure 15:
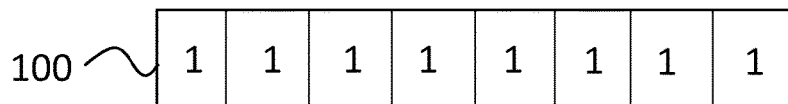
FIG. 15 is a further schematic diagram of a split-accumulation scheme, according to an example.
Figure 15:
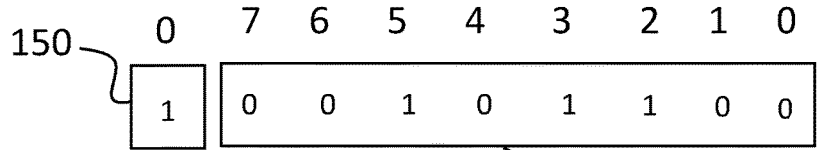
Figure 15:
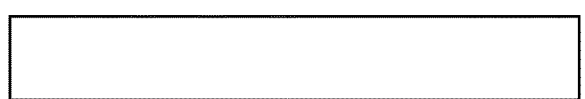

FIG. 15 is a simplified schematic diagram of the split-accumulation scheme, in accordance with method 730 using signed binary values. The example of FIG. 15 is similar to the example of FIG. 14, however, the value accumulated based on the new integer value and the current integer value stored into the first storage device exceeds the range of the first storage device 100, so an overflow is stored into an intermediate storage device.

Specifically, the current integer value stored into the first storage device 100 is 255, as a result of previous accumulation operations, such as in the example described in relation to FIG. 14. The new integer value is 45 together with the value 255, gives an accumulated decimal value of 300 that exceeds the range of the first storage device 100, having a maximum storable value of 255. The binary value 100101100 corresponds to the integer value 300.

Consequently, an upper portion of the accumulated binary value 100101100 that overflows the first storage device 100 is stored into bit 0 of the intermediate storage device 100, the upper portion being the $9^{th}$ bit of the accumulated binary value (highlighted in bold). Bits 0-7 of the first storage device 100 are set in accordance with the remainder of the binary value (underlined above). The second storage device 200 is not used to store the accumulated value 100101100.

The intermediate storage device 150 of FIG. 15 is understood to have a range defined with respect to the lowermost bit of the second storage device 200 as: −1, 0, +1. The +1 and −1 define the maximum and minimum values storable by the intermediate storage device 150. The 0 value is for when the accumulated value is not large enough to warrant use of the second storage device 200. The +1 and −1 are extreme values that indicate that at least the first bit of the second storage device 200 would be required to store the accumulated value. In this way, the use of the second storage device 200 is delayed until the accumulated value is large enough, that is outside the range of the intermediate device 150, to warrant activating one or more bits of the second storage device 200, without having a large number of bit changes for a single accumulation; thereby avoiding unnecessary toggling or changing of bits within the second storage device 200, which helps to reduce power consumption of the accumulator 950.

In the example of FIG. 14, the first storage device 100 is described as storing a current integer value of +150, however, in other examples, it may be the intermediate storage device 150 into which each accumulated value is stored into until the predetermined trigger is satisfied. In such a scenario, use of the two-part storage device 950 in its entirety is delayed because the intermediate storage device 950, being at least the same size as the first storage device 100, can be used in place of the first storage device 100 for smaller accumulations, saving power.

In other examples, the intermediate storage device 150 may be configured to store larger values than the first storage device 100 that correspond to a first plurality of bits of the second storage device, for instance the first three bits of the second storage device: +3, +2, +1, 0, −1, −2, −3. In such scenarios, when the accumulated value is determined to be outside the range of the intermediate storage device, the associated bits in the second storage device 200 are implemented as adder bits rather than part of an incrementor because the incrementor can only change one bit at a time, not multiple bits at a time, which would be required when writing the accumulated value in the intermediate storage device 150, associated with the first plurality of bits of the second storage device 200, into the two-part storage unit 950.

Although described separately above, the multi-level accumulation scheme described in relation to FIGS. 6-9 may be implemented in combination with the split-accumulation scheme described in relation to FIGS. 10-15.

The above examples are to be understood as illustrative examples. Further examples are envisaged. For example, although in examples above, the data processing system is described as being applicable for use in the classification of image data by a neural network, this is not to be taken as limiting. Indeed, it is to be appreciated that the data processing system may be used for classification or inference of any type of data (such as language data representative of words or sentences, for natural language processing), using any type of machine learning system. Furthermore, the data processing system may be used for other processing which does not involve a machine learning system. For example, the data processing system may be used to process image data using image data methods that involve convolution of kernels with image patches for other purposes than as part of a machine learning system.

It is to be appreciated that although certain components are shown as performing various steps of the methods described herein, in other examples, other components (such as other electronic components or other software and/or hardware) may perform these steps.

The order of processing steps in the examples described above are merely examples. In other examples, these processing steps may be performed in a different order. For example, an image or a feature map derived from image data may be divided into chunks, which may be referred to as tiles. Each tile may be processed separately through a layer of a neural network. Alternatively, an entire image or entire feature map may be processed using a subset of slices of a layer of a neural network (such as a subset of the total number of kernels associated with the layer) to generate partial results that may be added together to generate a final result.

The data processed using the methods and systems described herein may be of different formats. For example, such data may be signed or unsigned and may be integer or fixed point. Furthermore, such data may have a predetermined data size which differs from 8 bits.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure.

What is claimed is:

1. A method of operating an accumulation process in a data processing apparatus, the accumulation process comprising a plurality of accumulations which output a respective plurality of accumulated values, each based on a stored value and a computed value generated by a data processing operation, the method comprising:
   storing a first accumulated value, the first accumulated value being one of said plurality of accumulated values, into a first storage device comprising a plurality of single-bit storage elements;
   determining that a first predetermined trigger has been satisfied with respect to the accumulation process, wherein the first predetermined trigger is based on a maximum value that the first storage device can store; and
   in response to the determining, storing at least a portion of a second accumulated value, the second accumulated value being one of said plurality of accumulated values, into a second storage device;
   determining that a second predetermined trigger has been satisfied with respect to the second storage device; and
   in response to determining that the second predetermined trigger with respect to the second storage device, has been satisfied, outputting the second accumulated value for use in a data processing operation.

2. The method of claim 1, wherein the first predetermined trigger is based on at least one of a maximum value and a minimum value that the first storage device can store or a number of cycles, N, of accumulation.

3. The method of claim 1, wherein the first predetermined trigger is based on an expected result of the data processing operation determined prior to the expected result being generated by the data processing operation.

4. The method of claim 1, wherein the first storage device is in a primary memory level and the second storage device is in a secondary memory level, the primary memory level being quicker to access than the secondary memory level.

5. The method of claim 1, comprising accumulating the first accumulated value, wherein accumulating the first accumulated value comprises performing N cycles of accumulation of a value stored in the first storage device and a computed value generated by the data processing operation.

6. The method of claim 5, wherein storing into the second storage device occurs at a rate of 1/N relative to the rate of storing into the first storage device.

7. The method of claim 1, wherein the first storage device comprises a plurality of registers and the method further comprises:
   accumulating the first accumulated value in a first register of the plurality of registers;
   in response to the determining:
      reading the first accumulated value into an intermediate storage device; and
      storing a third accumulated value into a second register of the plurality of registers based on a computer value generated by the data processing operation.

8. The method of claim 1, wherein storing at least a portion of the second accumulated value into the second storage device comprises:
   converting the second accumulated value from an integer value to a floating-point value.

9. The method of claim 8, where the floating-point value is in the format of: one sign bit, five exponents bits and 10 mantissa bits.

10. The method of claim 8, wherein the first storage device is configured to store binary values and the second storage device is configured to store Gray coded values.

11. A data processing apparatus comprising:
    an arithmetic logic unit (ALU) configured to perform a data processing operation;
    a first storage device comprising a plurality of single-bit storage elements arranged to receive a value output by the data processing operation;
    a second storage device; and
    control logic configured to perform a method of operating an accumulation process in a data processing apparatus, the accumulation process comprising a plurality of accumulations which output a respective plurality of accumulated values, each based on a stored value and a computed value generated by a data processing operation, the method comprising:
    storing a first accumulated value, the first accumulated value being one of said plurality of accumulated values, into a first storage device comprising a plurality of single-bit storage elements;
    determining that a first predetermined trigger has been satisfied with respect to the accumulation process, wherein the first predetermined trigger is based on a maximum value that the first storage device can store; and
    in response to the determining, storing at least a portion of a second accumulated value, the second accumulated value being one of said plurality of accumulated values, into a second storage device;
    determining that a second predetermined trigger has been satisfied with respect to the second storage device; and in response to determining that the second predetermined trigger with respect to the second storage device, has been satisfied, outputting the second accumulated value for use in a data processing operation.

12. The data processing apparatus of claim 11, wherein the first predetermined trigger is based on a maximum value that the first storage device can store or a number of cycles, N, of accumulation.

13. The data processing apparatus of claim 12, wherein the first predetermined trigger is based on an expected result of the data processing operation determined prior to the expected result being generated by the data processing operation.

14. The data processing apparatus of claim 11, wherein the first storage device is in a primary memory unit and the second storage device is in a secondary memory unit, the primary memory unit being quicker to access than the secondary memory unit.

15. A non-transitory computer readable storage medium comprising instructions that, when executed by a processor, cause the processor to perform a method of operating an accumulation process in a data processing apparatus, the accumulation process comprising a plurality of accumulations which output a respective plurality of accumulated values, each based on a stored value and a computed value generated by a data processing operation, the method comprising:

storing a first accumulated value, the first accumulated value being one of said plurality of accumulated values, into a first storage device comprising a plurality of single-bit storage elements;

determining that a first predetermined trigger has been satisfied with respect to the accumulation process, wherein the first predetermined trigger is based on a maximum value that the first storage device can store; and in response to the determining, storing at least a portion of a second accumulated value, the second accumulated value being one of said plurality of accumulated values, into a second storage device;

determining that a second predetermined trigger has been satisfied with respect to the second storage device; and in response to determining that the second predetermined trigger with respect to the second storage device, has been satisfied, outputting the second accumulated value for use in a data processing operation.

\* \* \* \* \*